(12) United States Patent  
Ohba et al.

(10) Patent No.: US 12,216,942 B2
(45) Date of Patent: Feb. 4, 2025

(54) CONTROLLER AND CONTROL METHOD

(71) Applicant: Kioxia Corporation, Tokyo (JP)

(72) Inventors: Yoshihiro Ohba, Kawasaki Kanagawa (JP); Tomoya Sanuki, Yokkaichi Mie (JP); Takeshi Ishihara, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/483,468

(22) Filed: Oct. 9, 2023

(65) Prior Publication Data
US 2024/0126479 A1 Apr. 18, 2024

(30) Foreign Application Priority Data

Oct. 12, 2022 (JP) .................. 2022-164005
Jul. 12, 2023 (JP) .................. 2023-114531

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC .... G06F 3/0604; G06F 3/0659; G06F 3/0634; G06F 3/0769; G06F 3/0658; G06F 9/30032; G06F 9/3004; G06F 9/30076; G06F 9/30185; G06F 12/1009
See application file for complete search history.

(56) References Cited

U.S. PATENT DOCUMENTS

| | | | |
|---|---|---|---|
| 11,210,214 B2* | 12/2021 | Ogawa | G06F 12/0246 |
| 2010/0257334 A1* | 10/2010 | Kawakami | G06F 12/1009 |
| | | | 711/E12.001 |
| 2020/0089430 A1* | 3/2020 | Kanno | G06F 3/0616 |
| 2021/0150074 A1 | 5/2021 | Niell et al. | |
| 2022/0107738 A1 | 4/2022 | Ohba et al. | |
| 2022/0155969 A1 | 5/2022 | Subramanian et al. | |

FOREIGN PATENT DOCUMENTS

JP 2022-061450 A 4/2022

OTHER PUBLICATIONS

Ilaria Chillotti et al., "TFHE: Fast Fully Homomorphic Encryption over the Torus", 2018, pp. 1-62.
Ilaria Chillotti et al., "Programmable Bootstrapping Enables Efficient Homomorphic Inference of Deep Neural Networks", 2021, pp. 1-14.

* cited by examiner

*Primary Examiner* — Khoa D Doan
(74) *Attorney, Agent, or Firm* — Maier & Maier, PLLC

(57) ABSTRACT

According to one embodiment, a controller includes a first interface, a second interface, a virtual register table, a memory management unit and a calculation processing unit. The first interface receives an I/O command from a host. The second interface transmits and receives first host data to and from a storage. The virtual register table has a virtual address specified by a page number assigned to a page in which data to be used to process a calculation instruction is stored and a page offset, and a data size of the data. The memory management unit stores, into a memory, the copy of the first host data, and updates the virtual register table. The calculation processing unit processes the calculation instruction by referring to the virtual register table.

18 Claims, 27 Drawing Sheets

| Type | Key ID | Data ID | Virtual register number | Virtual register name |
|---|---|---|---|---|
| 0(PRG) | 0 | 0 | 0 | Program register |
| 1(LUT) | 0 | x | 1+x | LUT register |
| 2(KEY) | k | y | $1+N_{LUT}+2k+y$ | BK register(y=0) <br> KSK register(y=1) |
| 3(TLWE-CoR) or 4(TLWE-CoW) | k | z | $1+N_{LUT}+2N_{key}+kN_{TLWE}+z$ | Ciphertext register |

$0 \le x < N_{LUT}, 0 \le y \le 1, 0 \le k < N_{key}, 0 \le z < N_{TLWE}$ $N_{LUT}$: Maximum number of LUT registers $N_{key}$: Maximum number of BK registers and KSK registers $N_{TLWE}$: Total number of ciphertext registers per BK register

FIG. 3

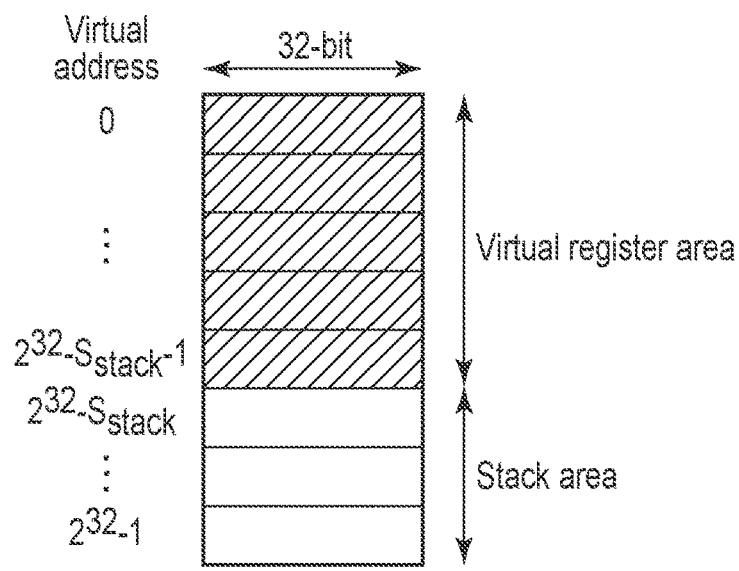

FIG. 4

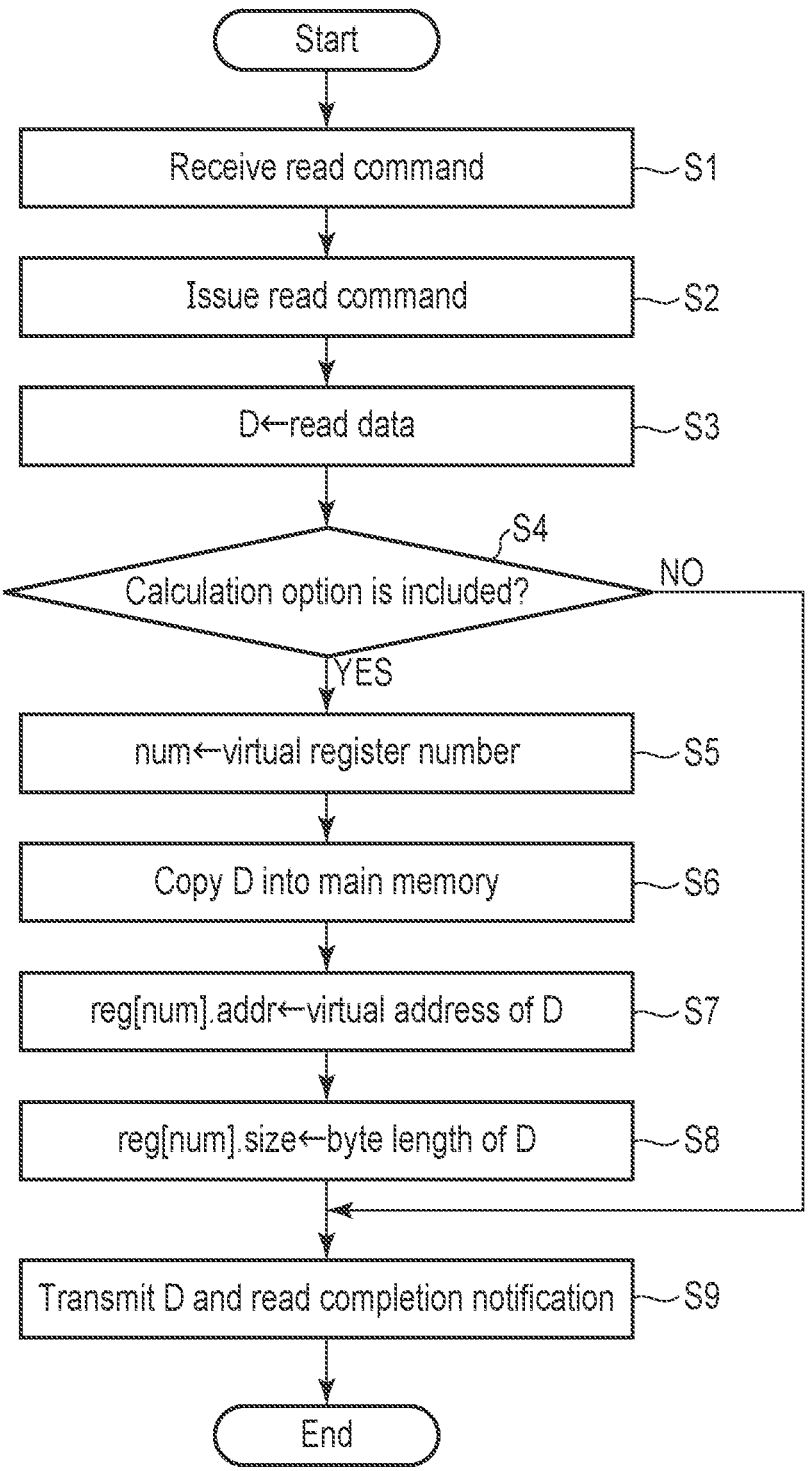
F I G. 5

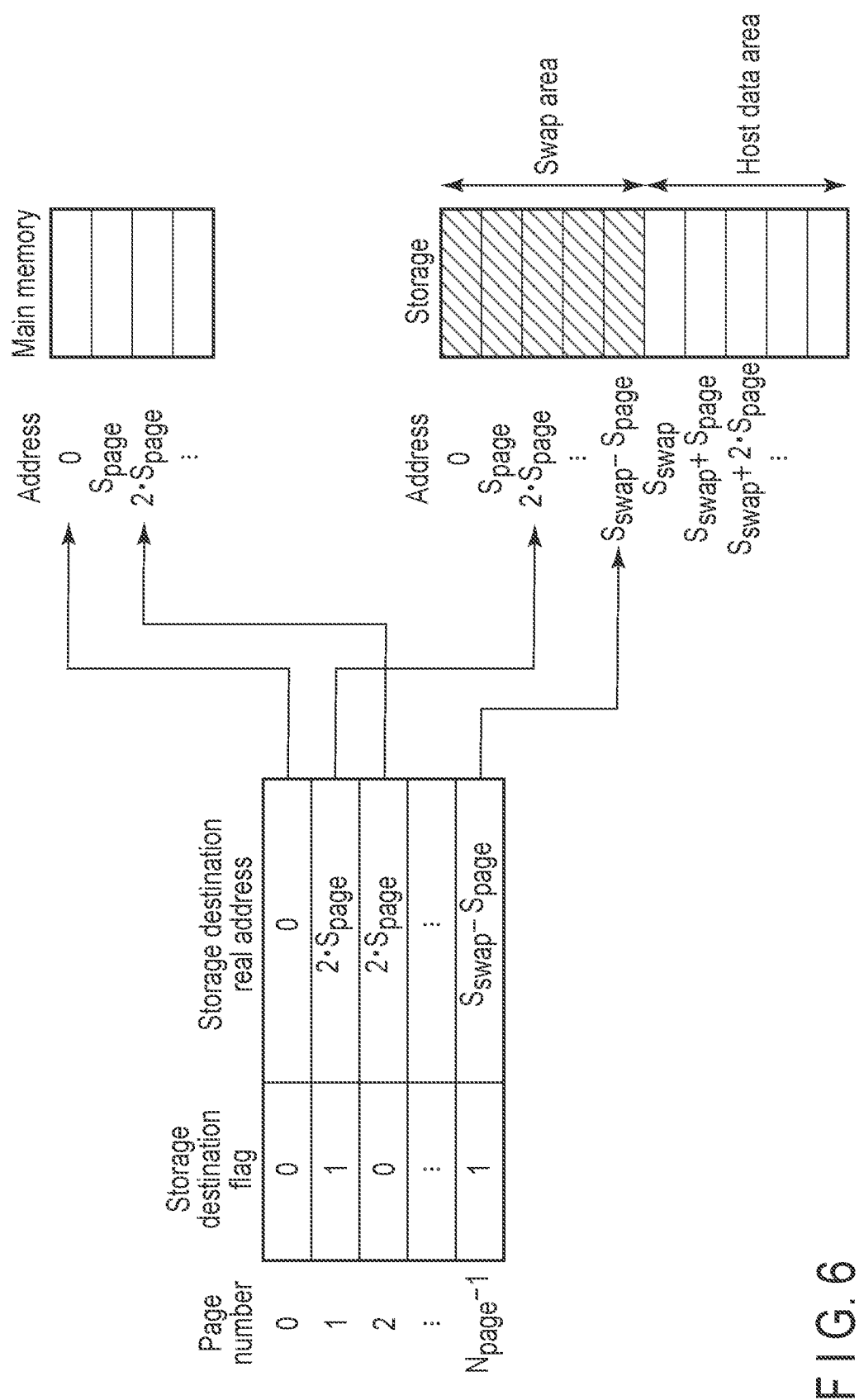
F I G. 6

| Command type | Argument 1 | Argument 2 |
|---|---|---|
| 0 (Return) | num:Ciphertext register number | None |
| 1 (Move) | num1:Ciphertext register number | num2:Ciphertext register number |
| 2 (Push) | num:Ciphertext register number | None |
| 3 (Pop) | num:Ciphertext register number | None |
| 4 (Bootstrap) | num1:LUT register number | num2:Ciphertext register number |
| 5 (Add) | num1:Ciphertext register number | num2:Ciphertext register number |
| 6 (Sub) | num1:Ciphertext register number | num2:Ciphertext register number |
| 7 (IntMult) | num:Ciphertext register number | val:Integer value |

F I G. 11

```
mov 0,1
add 0,2
bootstrap 1,0
sub 1,2
bootstrap 1,1
sub 0,1
bootstrap 2,0
return 0
```

F I G. 12

| LUT registers | LUT data |
|---|---|
| LR 1 | $f_1(x) = x^2$ |
| LR 2 | $f_1(x) = x/4$ |

FIG. 13

| Ciphertext register | CR 0 | CR 1 | CR 2 |
|---|---|---|---|
| Value of ciphertext register | cleared | x | y |

FIG. 14

| Order | Ciphertext register | | | Stack |
|---|---|---|---|---|
| | CR 0 | CR 1 | CR 2 | |
| mov 0,1 | x | x | y | cleared |
| add 0,2 | x+y | ↓ | ↓ | ↓ |
| bootstrap 1,0 | $(x+y)^2$ | ↓ | ↓ | ↓ |
| sub 1,2 | ↓ | x−y | ↓ | ↓ |
| bootstrap 1,1 | ↓ | $(x-y)^2$ | ↓ | ↓ |
| sub 0,1 | 4xy | ↓ | ↓ | ↓ |
| bootstrap 2,0 | xy | ↓ | ↓ | ↓ |
| return 0 | return & cleared | cleared | cleared | cleared |

FIG. 15

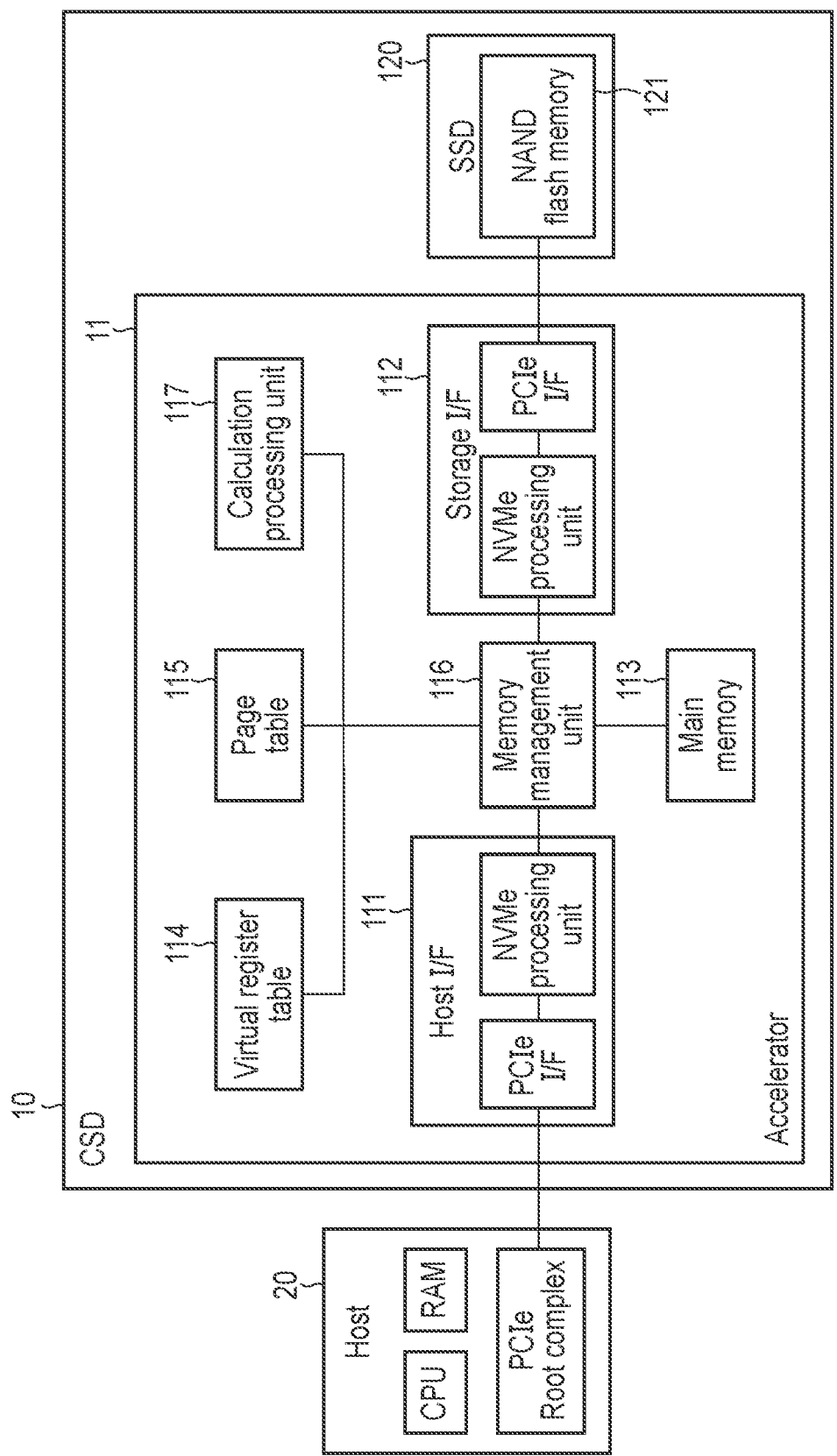
F I G. 16

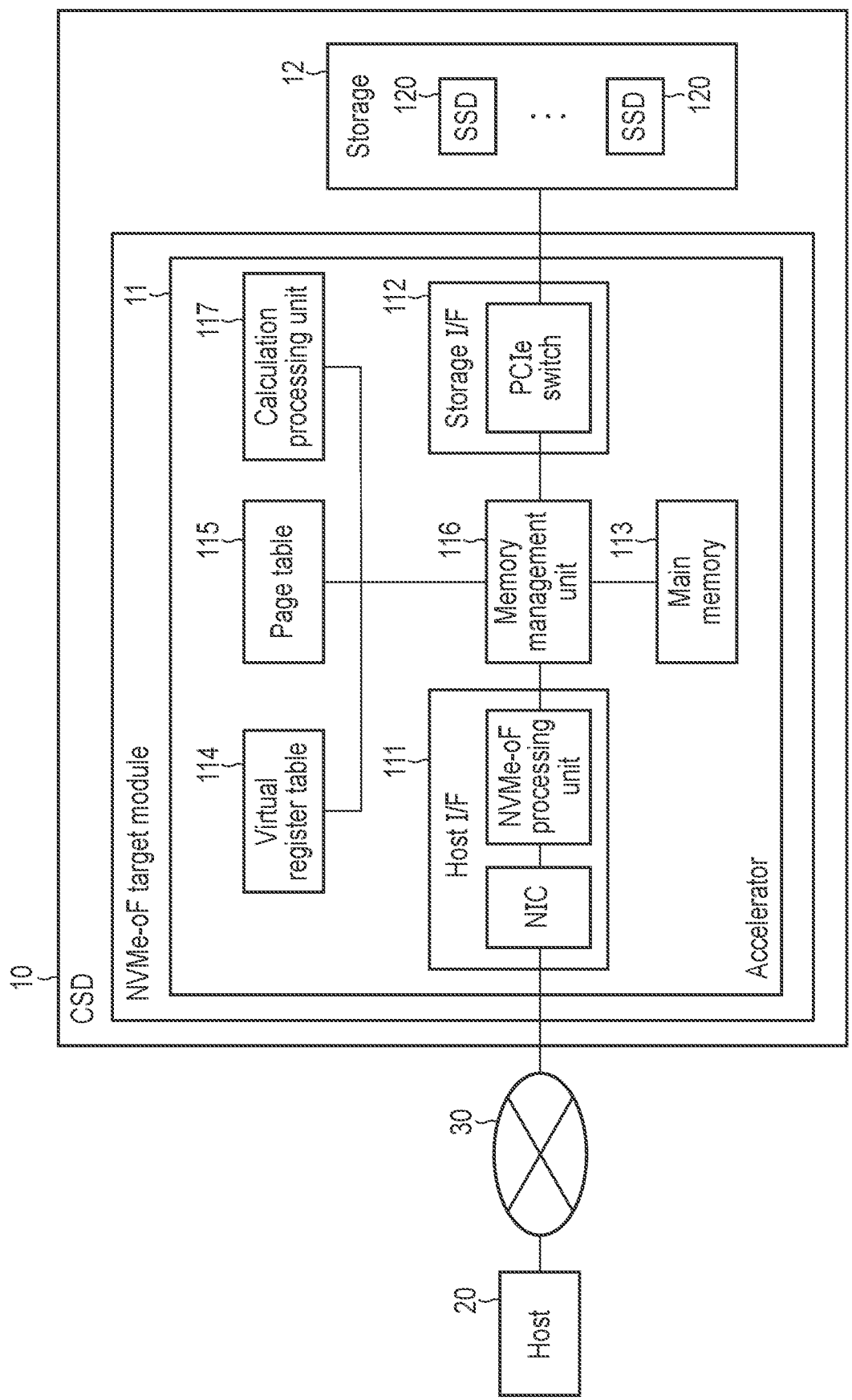
F I G. 18

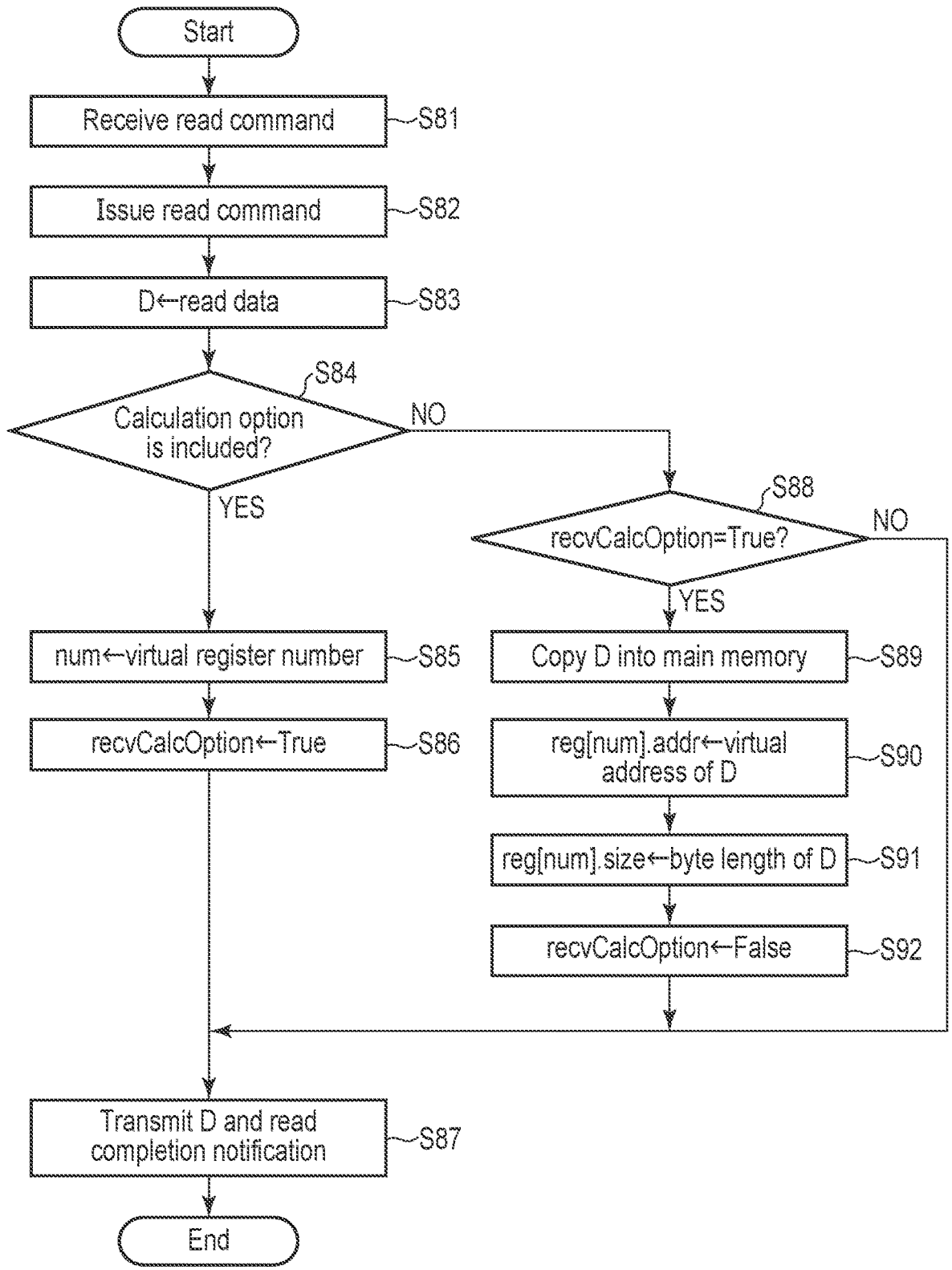
F I G. 19

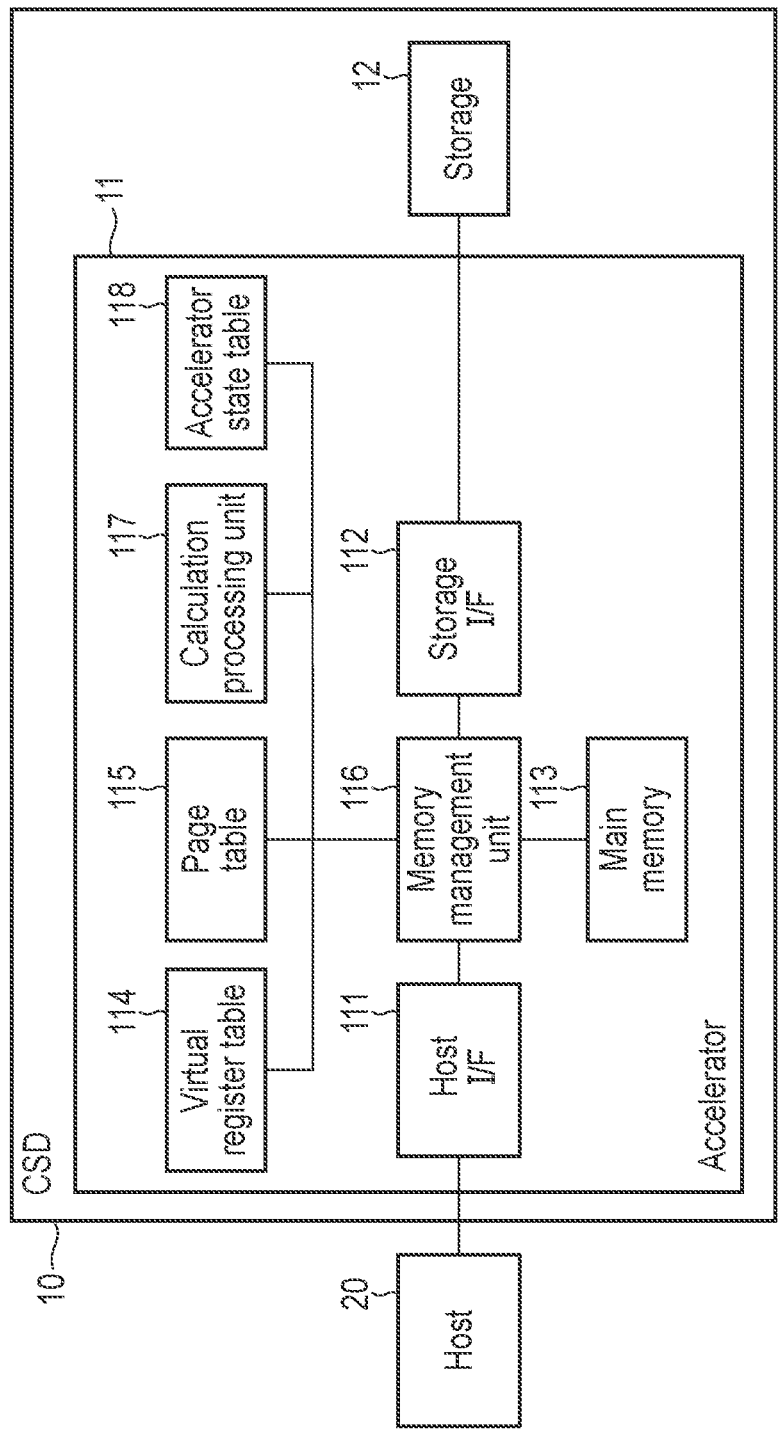
F I G. 23

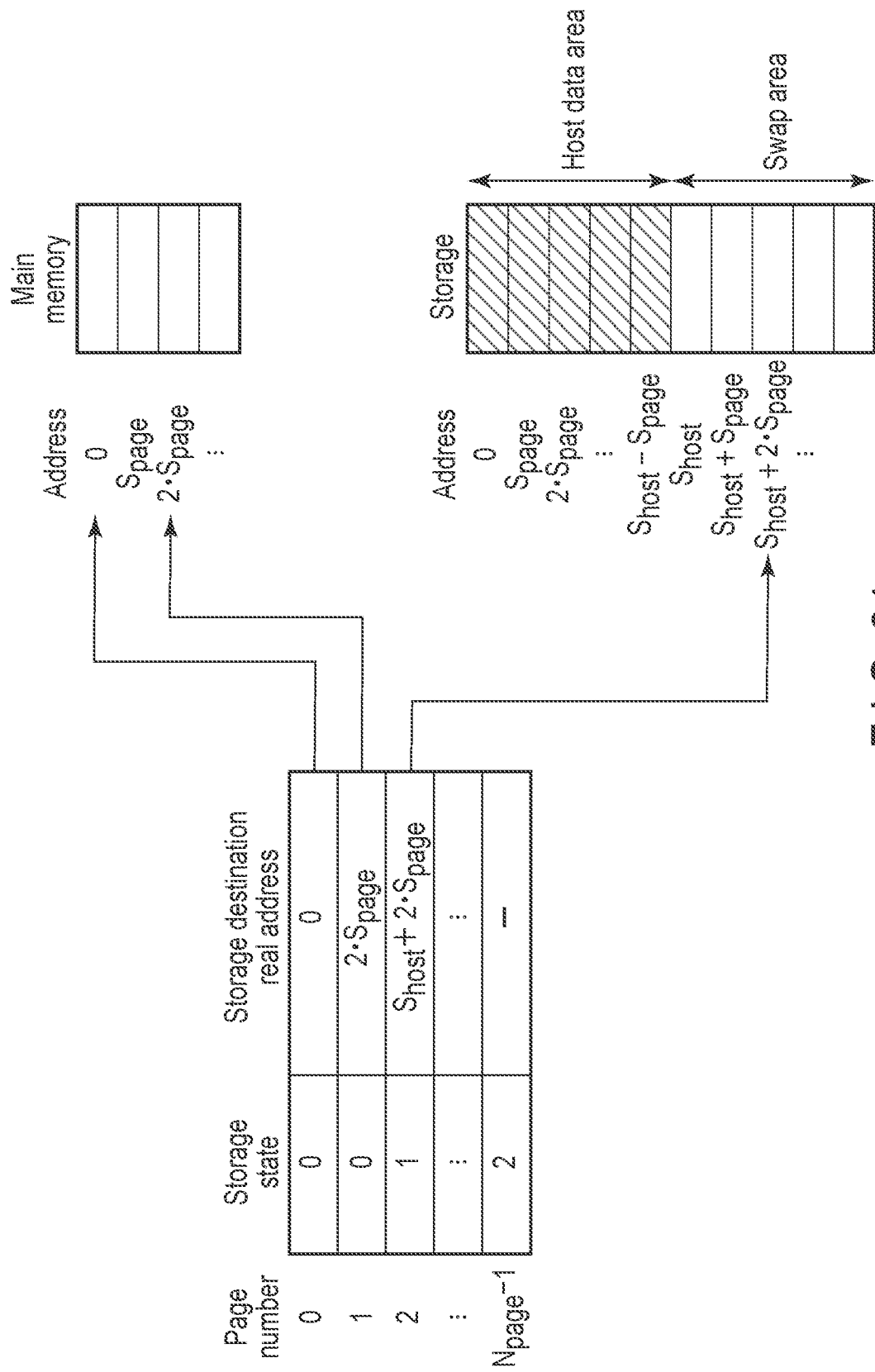
F I G. 24

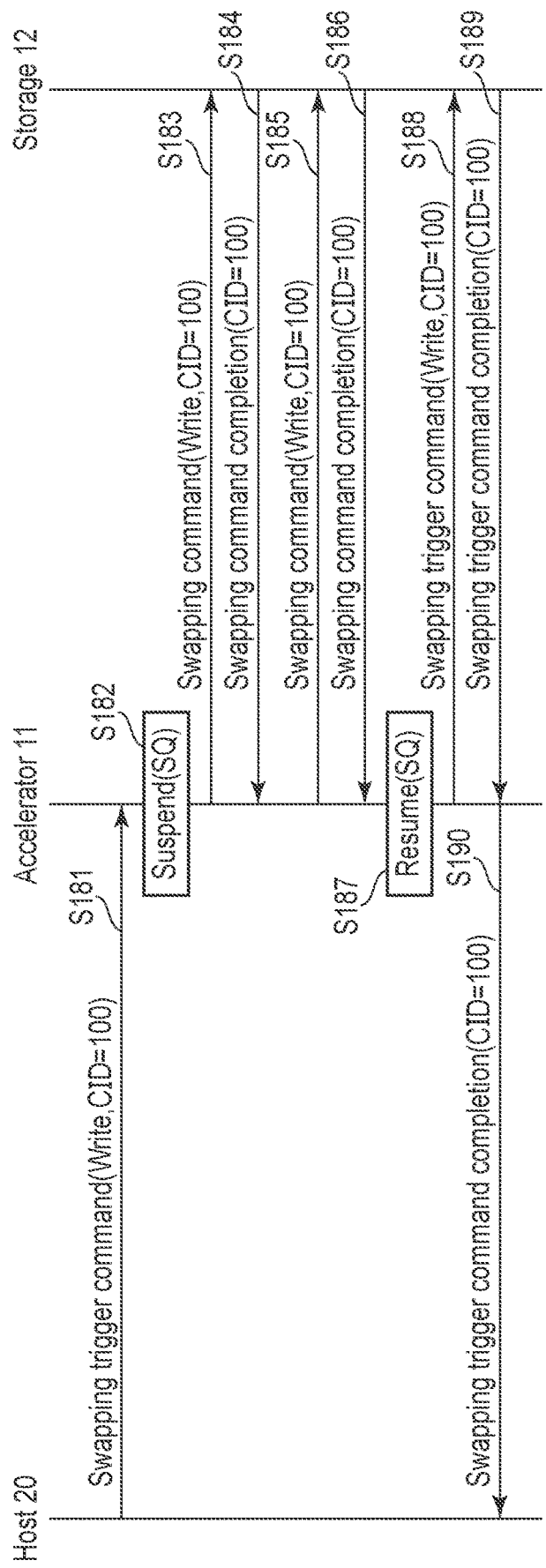
F I G. 26

| Swapping trigger command CID | Queue type (0:Submission queue, 1:Completion queue) | Queue ID |
|---|---|---|
| 100 | 0 | 1 |

FIG. 27

| Swapping trigger command CID | Queue type (0:Submission queue, 1:Completion queue) | Queue ID |
|---|---|---|
| 100 | 1 | 1 |

FIG. 29

| Swapping trigger command CID | Queue type (0:Submission queue, 1:Completion queue) | Queue ID |
|---|---|---|
| 100 | 0 | 1 |
| 101 | 0 | 2 |

FIG. 31

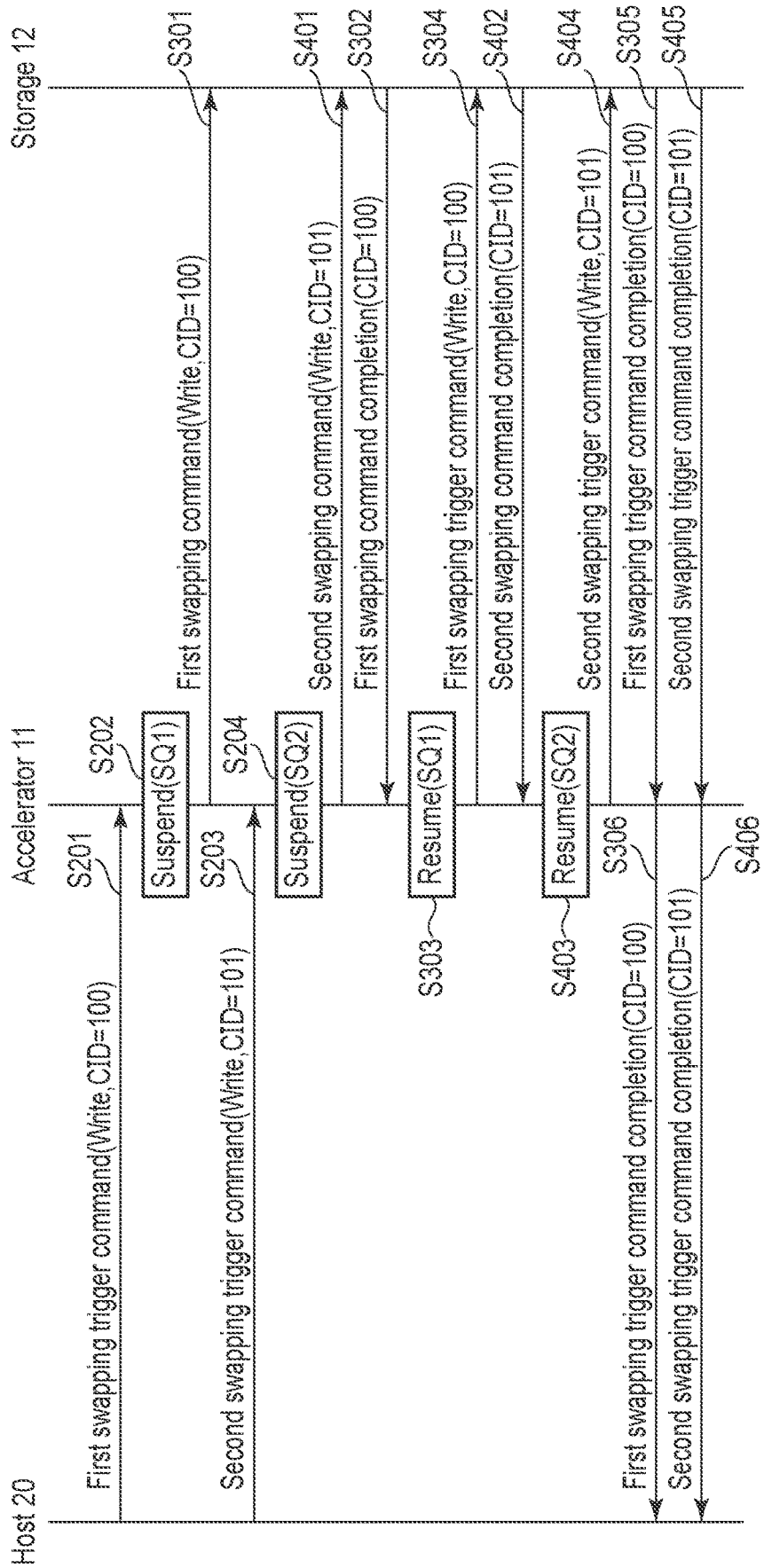
F I G. 30

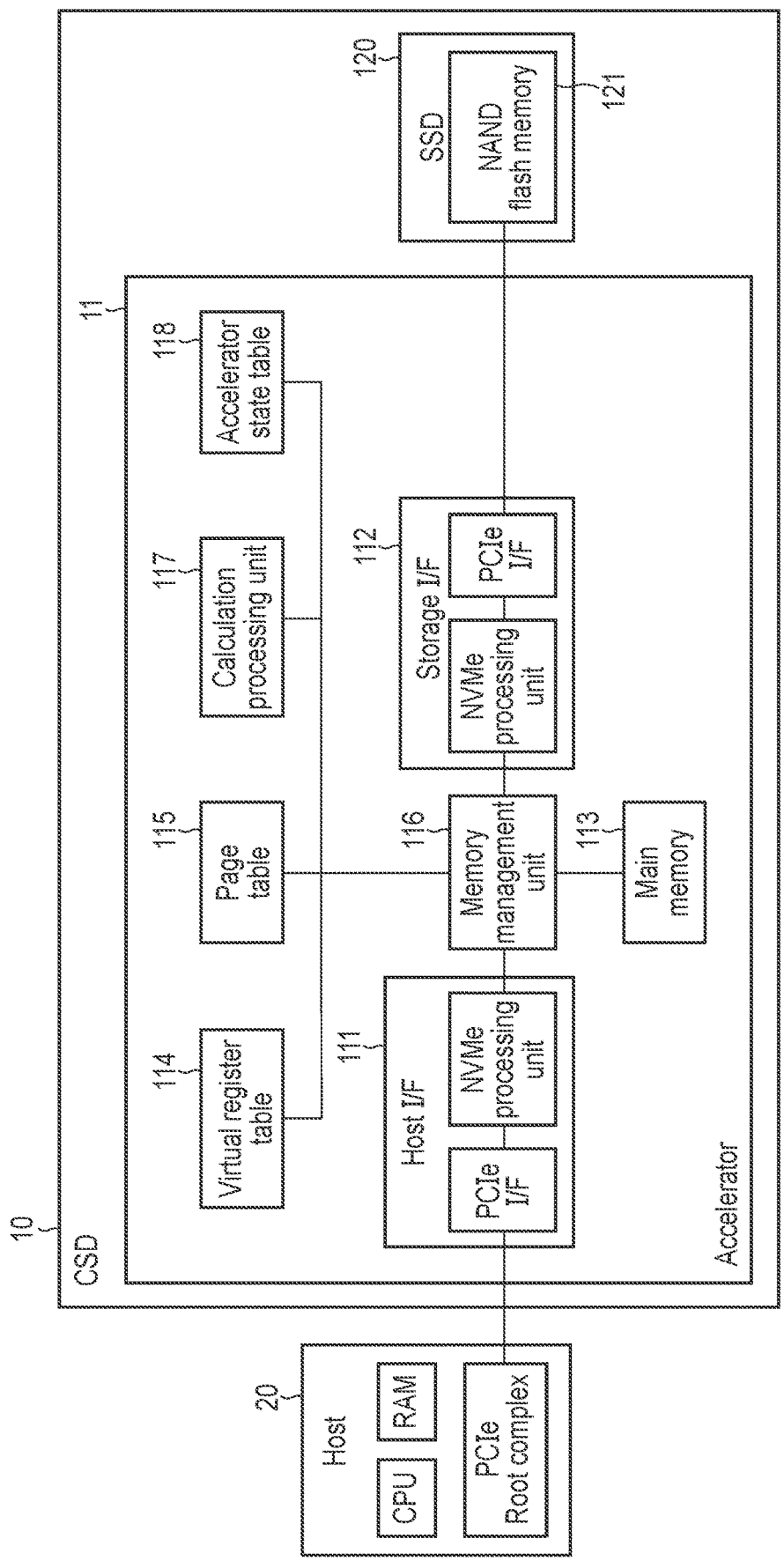
F I G. 32

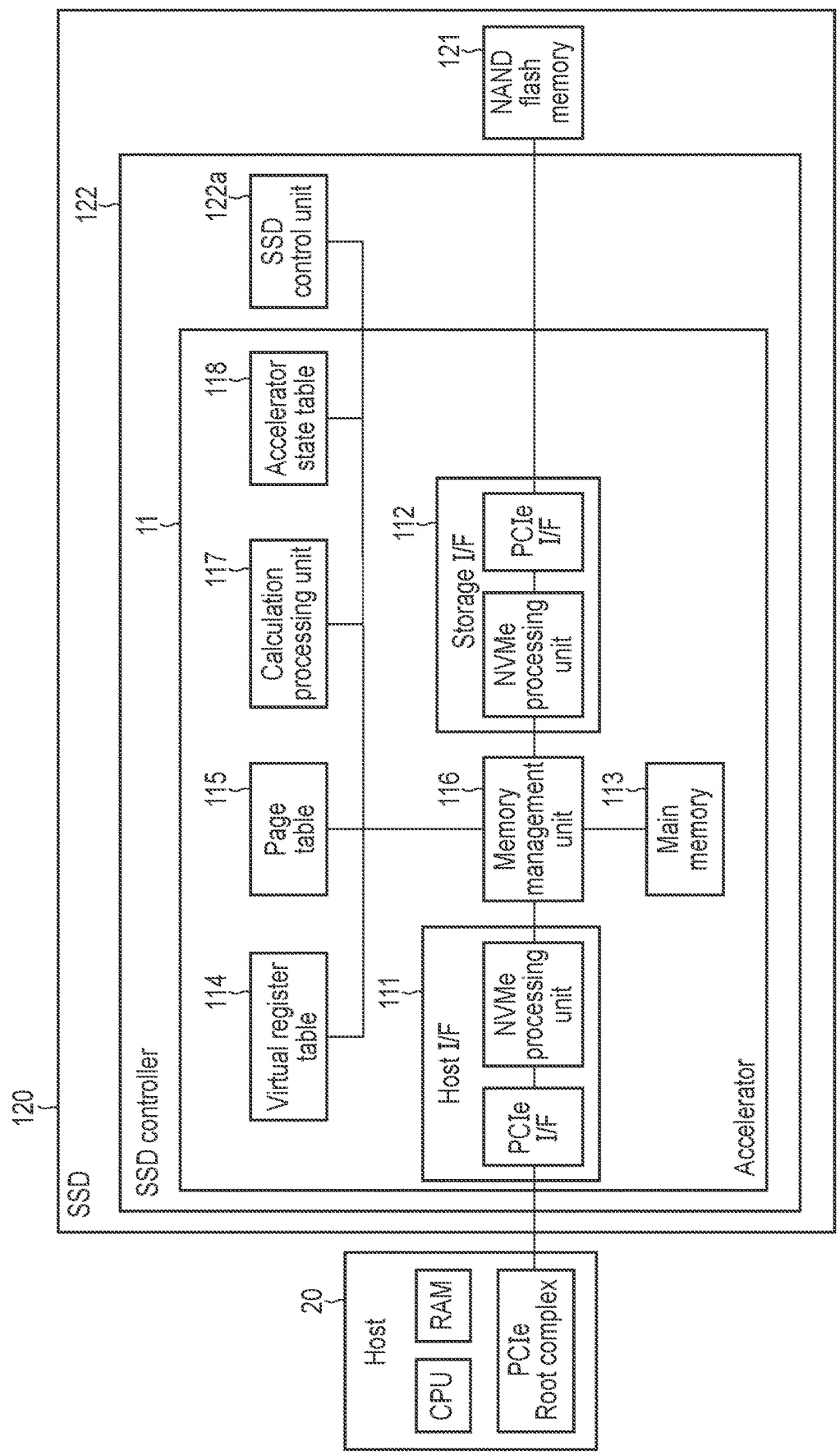
F I G. 33

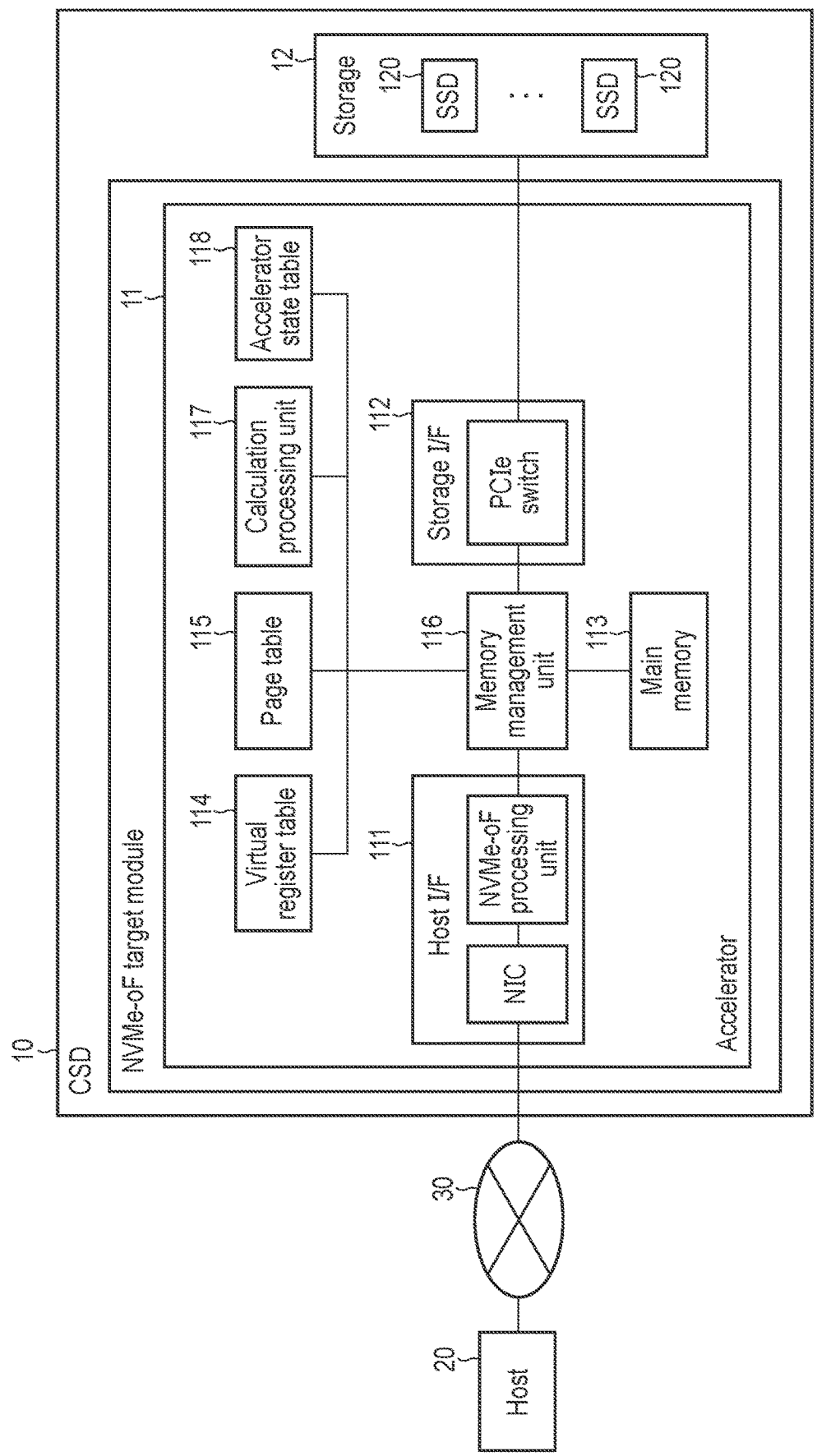
F I G. 34

CONTROLLER AND CONTROL METHOD

CROSS-REFERENCE TO RELATED APPLICATIONS

This application is based upon and claims the benefit of priority from Japanese Patent Applications No. 2022-164005, filed Oct. 12, 2022; and No. 2023-114531, filed Jul. 12, 2023, the entire contents of all of which are incorporated herein by reference.

FIELD

Embodiments described herein relate generally to a controller and a control method.

BACKGROUND

A storage device (hereinafter referred to as a computing storage device) that have a function of processing calculation instructions in place of a host is being developed these days.

In such a computing storage device, when a computing storage I/O command (hereinafter referred to as an I/O command) transmitted from a host is received, a calculation instruction is processed in accordance with a calculation option accompanying the I/O command, so that host data (read data or write data) designated in the I/O command can be replaced with the result of the processing (a calculation result).

BRIEF DESCRIPTION OF THE DRAWINGS

FIG. 3 is a diagram for explaining an example of a method for calculating a virtual register number according to the first embodiment.

FIG. 4 is a diagram schematically illustrating a virtual address space according to the first embodiment.

FIG. 5 is a flowchart illustrating an example of processing procedures to be carried out by an accelerator operating in a CwR mode according to the first embodiment.

FIG. 6 is a diagram illustrating an example of the data structure of a page table according to the first embodiment.

FIG. 11 is a diagram illustrating an example of an instruction set of secret calculation instructions that are used by the accelerator according to the first embodiment.

FIG. 12 is a diagram illustrating an example of a program according to the first embodiment.

FIG. 13 is a diagram illustrating an example of an LUT that is used by the program according to the first embodiment.

FIG. 14 is a diagram illustrating an example of the states of ciphertext registers immediately before execution of the program according to the first embodiment.

FIG. 15 is a diagram illustrating state transitions of the ciphertext registers and a stack in a case where the program is executed according to the first embodiment.

FIG. 16 is a diagram for explaining the configuration of a computing storage device that performs communication with a host based on the NVMe standard according to the first embodiment.

FIG. 18 is a diagram for explaining a configuration in which the accelerator according to the first embodiment is disposed inside an NVMe-oF target module.

FIG. 19 is a flowchart illustrating an example of processing procedures to be carried out by an accelerator operating in a CwR mode according to a second embodiment.

FIG. 23 is a block diagram illustrating an example of the configuration of a computing storage device according to a third embodiment.

FIG. 24 is a diagram illustrating an example of the data structure of a page table according to the third embodiment.

FIG. 26 is a sequence chart for explaining an example of an operation to be performed by an accelerator according to the third embodiment.

FIG. 27 is a diagram illustrating an example of an entry stored in an accelerator state table according to the third embodiment.

FIG. 29 is a diagram illustrating another example of an entry stored in the accelerator state table according to the third embodiment.

FIG. 30 is a sequence chart for explaining yet another example of an operation to be performed by the accelerator according to the third embodiment.

FIG. 31 is a diagram illustrating yet another example of an entry stored in the accelerator state table according to the third embodiment.

FIG. 32 is a diagram for explaining the configuration of a computing storage device that performs communication with a host based on the NVMe standard according to the third embodiment.

FIG. 33 is a diagram for explaining a configuration in which the accelerator according to the third embodiment is disposed inside an SSD controller.

FIG. 34 is a diagram for explaining a configuration in which the accelerator according to the third embodiment is disposed inside an NVMe-oF target module.

DETAILED DESCRIPTION

In general, according to one embodiment, a controller for controlling a computing storage device that is connectable to a host and includes a storage is provided. The controller includes a first interface, a second interface, a memory, a virtual register table, a memory management unit and a calculation processing unit. The first interface is configured to receive an I/O command from the host. The I/O command designates first host data. The second interface is configured to transmit and receive the first host data to and from the storage. The memory is for storing a copy of the first host data designated in the I/O command. The virtual register table has a virtual address specified by a page number assigned to a page in which data to be used to process a calculation instruction in accordance with a calculation option accompanying the first host data is stored and a page offset, and a data size of the data. The virtual address and the data size are associated with each virtual register number identified based on the calculation option. The memory management unit is configured to store, into the memory, the copy of the first host data designated in the I/O command, and update the virtual register table. The calculation processing unit is configured to process the calculation instruction using the first host data designated in the I/O command, by referring to the virtual register table.

Hereinafter, embodiments will be described with reference to the drawings.

First Embodiment

Figures 1, 2:
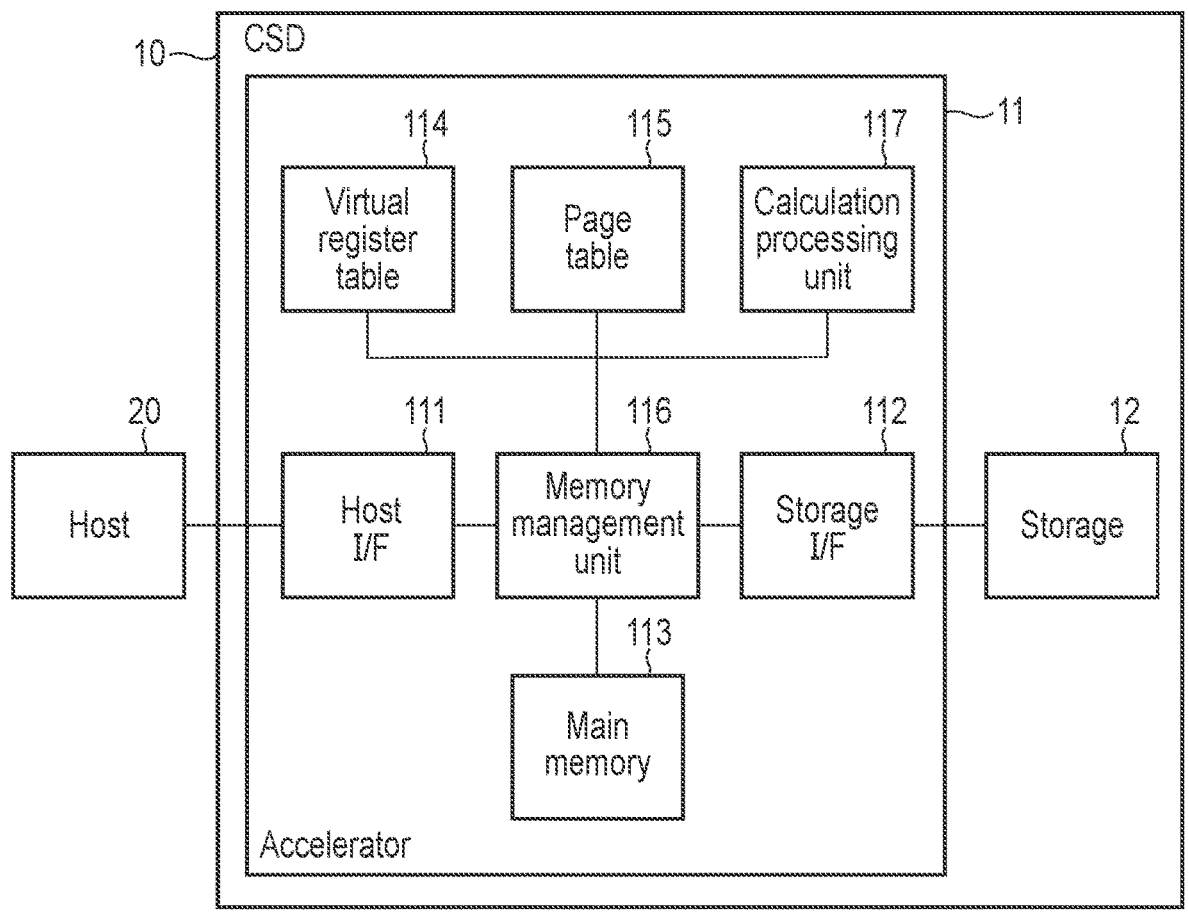
FIG. 1 is a block diagram illustrating an example of the configuration of a computing storage device according to a first embodiment.
FIG. 2 is a diagram for explaining the data structure of a virtual register table according to the first embodiment.

First, a first embodiment is described. FIG. 1 is a block diagram illustrating an example of the configuration of a computing storage device (hereinafter referred to as the CSD) according to the present embodiment. A CSD 10 illustrated in FIG. 1 corresponds to a storage device having a function of processing calculation instructions, for example, and is also referred to as a memory system.

The CSD 10 is designed to be connectable to a host 20, and includes an accelerator 11 and a storage 12.

The accelerator 11 is a device that operates to increase the processing speed of the computer system (the CSD 10 and the host 20), and corresponds to a controller that controls the CSD 10. As illustrated in FIG. 1, the accelerator 11 includes a host interface (I/F) 111, a storage interface (I/F), a main memory 113, a virtual register table 114, a page table 115, a memory management unit 116, and a calculation processing unit 117.

The host interface 111 receives, from the host 20, a computing storage I/O command (hereinafter referred to as the I/O command) that designates host data. The I/O command includes a read command for reading data from the storage 12, and a write command for writing data into the storage 12. The host data designated in the I/O command includes read data to be read from the storage 12 and write data to be written into the storage 12 based on the I/O command (the read command and the write command). In the I/O command, host data is designated by a logical address to be used to access the storage 12 (to read data from the storage 12 and to write data into the storage 12). The host interface 111 transmits and receives host data to and from the host 20.

The storage interface 112 transmits and receives host data to and from the storage 12. That is, in a case where the host data is read data, the storage interface 112 receives the read data from the storage 12. In a case where the host data is write data, on the other hand, the storage interface 112 transmits the write data to the storage 12.

The main memory 113 is used to store a copy of the host data (the data read/written in accordance with the I/O command) designated in the I/O command. The main memory 113 is designed to be accessible at a higher speed than the storage 12, and is formed with, for example, a memory (not shown) such as a DRAM provided in the CSD 10.

The virtual register table 114 is a table for managing virtual registers that hold data to be used to process calculation instructions in accordance with calculation options accompanying the host data designated in the I/O command. Specifically, the virtual register table 114 stores (has) virtual addresses indicated by page numbers assigned to the pages that store the data to be used to process calculation instructions in accordance with calculation options and page offsets, and the sizes of the data. The virtual addresses and the data sizes are associated with the respective virtual register numbers identified (calculated) based on the calculation options. Note that the virtual register numbers identified based on calculation options will be described later in detail.

The page table 115 is a table for managing whether the storage destination of the data in the page is the main memory 113 or the storage 12 (the swap area described later) for each page number. Specifically, the page table 115 stores (has) flags indicating the storage destinations of data (hereinafter referred to as the storage destination flags) and the real addresses of the storage destinations (hereinafter referred to as the storage destination real addresses) that are associated with the respective page numbers.

The memory management unit 116 performs a process of storing a copy of the host data designated in the I/O command into the main memory 113 by referring to the page table 115, and updating the virtual register table 114, in accordance with the operation mode of the CSD 10 described later.

The calculation processing unit 117 refers to the virtual register table 114, and processes a calculation instruction (a calculation instruction using the host data) in accordance with the calculation option accompanying the host data designated in the I/O command.

Referring now to FIG. 2, the data structure of the virtual register table 114 (the virtual registers that are managed in the virtual register table 114) described above with reference to FIG. 1 is described.

The virtual register table 114 stores the virtual addresses and the data sizes associated with the virtual register numbers as described above. In other words, in the present embodiment, one virtual register is referred to using a virtual register number allocated to the virtual register, and is represented by a set of a virtual address (addr) and a data size (size).

A virtual address indicates the memory area represented by a set of a page number and a page offset. Data sizes are measured in bytes. Note that, in FIG. 2, it is assumed that the total number of virtual registers that are managed by the virtual register table 114 is $N_{reg}$.

Meanwhile, the host data designated in an I/O command received from the host 20 is accompanied by a calculation option for processing a calculation instruction. The calculation option includes a content identifier and a data size (bytes). The content identifier is represented by (a set of) a Type, a Key ID, and a Data ID.

In a case where a calculation option that can be used in Torus Fully Homomorphic Encryption (TFHE), which is one of secret calculation techniques (secret computation techniques), is assumed to be an example of the structure of the calculation option, the Type is a TFHE data type, the Key ID is a key number, and the Data ID is a TFHE data identifier. Note that the Type is represented by a value of 0 to 4, the Key ID is represented by a value of 0 or greater, and the Data ID is represented by a value of 0 or greater. Note that the torus in TFHE is a mathematical structure called an algebraic torus or a circumferential group, and is a multiplicative group $T=\{z \in C:|z|=1\}^\times$, which is defined by a set of points $\{z \in C:|z|=1\}$ on a unit circle in the complex plane C and a binary operation "×". In TFHE, lattice encryption called Torus Learning with Errors (TLWE) is used. A ciphertext in TFHE is called a TLWE sample, and is indicated as a vector of a torus. In the present embodiment, a torus is scaled and encoded as a 32-bit integer value.

A virtual register number in the virtual register table 114 described above is calculated (identified) from a content identifier included in such a calculation option.

Referring now to FIG. 3, an example of a method for calculating a virtual register number is described. Virtual registers according to the present embodiment include a program register, LUT registers, BK registers, KSK registers, and ciphertext registers.

The program register stores a sequence (which is a program) of calculation instructions (secret calculation instructions).

A LUT register stores a test vector of TFHE. A test vector (LUT) stored in a LUT register corresponds to, for example, a coefficient for a predetermined function (polynomial).

A BK register stores a bootstrapping key of TFHE. A bootstrapping key stored in a BK register is used in Gate Bootstrapping (GBS) or Programmable Bootstrapping (PBS) of TFHE. PBS is a bootstrapping method by which a TLWE sample as a result of evaluating an input TLWE sample with homomorphism by a predetermined function is output after reducing its noise to the noise level of a fresh sample.

A KSK register stores a key switch key of TFHE. A key switch key stored in a KSK register is used in post-processing after GBS or PBS.

A ciphertext register stores a TLWE sample. There are two kinds of ciphertext registers: TLWE-CoR (CoR register) and TLWE-CoW (CoW register).

In FIG. 3, in a case where the Type is 0, the Key ID is 0, and the Data ID is 0, for example, a virtual register number "0" is calculated from the Type, the Key ID, and the Data ID (which is the content identifier), and indicates that the virtual register is a program register.

Also, in FIG. 3, in a case where the Type is 0, the Key ID is 0, and the Data ID is x, for example, a virtual register number "1+x" is calculated from the Type, the Key ID, and the Data ID (which is the content identifier), and indicates that the virtual register is a LUT register.

Further, in FIG. 3, in a case where the Type is 2, the Key ID is k, and the Data ID is y, for example, a virtual register number "$1+N_{LUT}+2$ k+y" is calculated from the Type, the Key ID, and the Data ID (which is the content identifier), and indicates that the virtual register is a BK register or a KSK register. Note that the virtual register when y=0 is a BK register, and the virtual register when y=1 is a KSK register.

Also, in FIG. 3, in a case where the Type is 3 or 4, the Key ID is k, and the Data ID is z, for example, a virtual register number "$1+N_{LUT}+2N_{key}+kN_{TLWE}+z$" is calculated from the Type, the Key ID, and the Data ID (which is the content identifier), and indicates that the virtual register is a ciphertext register.

Note that x is assumed to be an integer that is not smaller than 0 but is smaller than $N_{LUT}$ ($0 \le x < N_{LUT}$). It is assumed that y is an integer that is not smaller than 0 and not greater than 1 ($0 \le y \le 1$), which is y=0 or y=1. It is assumed that k is an integer that is not smaller than 0 but smaller than $N_{key}$ ($0 \le k < N_{key}$). It is assumed that z is an integer that is not smaller than 0 but smaller than $N_{TLWE}$ ($0 \le z < N_{TLWE}$).

$N_{LUT}$ is the maximum number of LUT registers. $N_{key}$ is the maximum number of BK registers and KSK registers. $N_{TLWE}$ is the total number of ciphertext registers per BK register.

Next, FIG. 4 is a diagram schematically illustrating a virtual address space according to the present embodiment. The virtual address space includes a virtual register area and a stack area.

The virtual register area is the area corresponding to the program register, LUT registers, BK registers, KSK registers, and ciphertext registers. The stack area is the area storing ciphertext registers in stack operations using a Push instruction and a Pop instruction as described later. The stack area has a structure that holds ciphertexts stored in the ciphertext registers in a last-in last-out (LILO) format.

Note that, in the example illustrated in FIG. 4, a virtual address is a 32-bit address. Also, in FIG. 4, $S_{stack}$ indicates the stack size (the size of the stack area) in bytes. In this case, the maximum value of a virtual address that can use the virtual register area is $2^{32}-S_{stack}-1$. Further, the virtual address at the bottom of the stack area is represented by $2^{32}-1$. Furthermore, in a case where (the main memory 113 for) the virtual register area and the stack area is accessed, the page table 115 is used. Note that the page table 115 will be described later in detail.

In the description below, an operation of the accelerator 11 according to the present embodiment is explained. The accelerator 11 according to the present embodiment operates in each of a copy-with-read (CwR) mode, a copy-with-write (CwW) mode, a compute-on-read (CoR) mode, and a compute-on-write (CoW) mode.

Note that host data according to the present embodiment includes host data accompanied by a calculation option and host data not accompanied by a calculation option. Further, in a case where the host data is accompanied by a calculation option, the calculation option is included in metadata attached to the host data.

FIG. 5 is a flowchart illustrating an example of processing procedures to be carried out by the accelerator 11 operating in the CwR mode. The CwR mode is an operation mode for copying, into the main memory 113, host data (read data) designated in a read command from the host 20.

First, the host interface 111 receives a read command (I/O command) from the host 20 (step S1). The read command received in step S1 includes a logical address to be used to access read data.

Next, the storage interface 112 issues (transmits) the read command received in step S1 to the storage 12 (step S2).

After the process in step S2 is performed, the host data is read from the storage 12 based on the logical address included in the read command. In this case, the memory management unit 116 receives a read completion notification and the read data corresponding to the read completion notification, from the storage 12 via the storage interface 112. The memory management unit 116 stores the received read data into a variable D (step S3).

Next, the memory management unit 116 determines whether a calculation option is included in the metadata attached to the read data (which is the variable D) (step S4).

If it is determined that a calculation option is included in the metadata attached to the read data (YES in step S4), the memory management unit 116 stores the virtual register number calculated based on the calculation option (content identifier) into a variable num (step S5).

Next, the memory management unit 116 copies the variable D (read data) into free space in the main memory 113 (step S6).

After the process in step S6 is performed, the memory management unit 116 sets, in the virtual register table 114, the virtual address indicating the memory area of the main memory 113 into which the variable D has been copied, as the virtual address corresponding to the variable num (the virtual address to be referred to with the virtual register number stored in the variable num). In other words, the first virtual address of the copy destination of the variable D is set in the virtual address field (reg[num].addr) in the num-th virtual register (step S7).

Further, the memory management unit 116 sets, in the virtual register table 114, the data size of the variable D as the data size corresponding to the variable num (the data size to be referred to with the virtual register number stored in the variable num). In other words, the byte length of the variable D is set in a data size field (reg[num].size) in the num-th virtual register (step S8).

After the process in step S8 is performed, the memory management unit 116 transmits the variable D (which is the read data) and a read completion notification to the host 20 (which is the transmission source of the read command) via the host interface 111 (step S9).

Note that, if it is determined in step S4 that any calculation option is not included in the metadata attached to the read data (NO in step S4), the process in step S9 is performed. That is, in a case where any calculation option is not included in the metadata attached to the read data, a copy of the read data is not stored into the main memory 113.

According to the process described above with reference to FIG. 5, a copy of read data to which metadata including a calculation option is attached can be stored into the main memory 113, based on a read command transmitted from the host 20. The read data copied into the main memory 113 in this manner can be used when the calculation instruction described later is processed.

Note that a case where a copy of the host data designated by an I/O command (read command) has not been stored into the main memory 113 at the time of execution of the process illustrated in FIG. 5 has been described with reference to FIG. 5. However, in a case where a copy of the host data (read data) has already been stored into the main memory 113, and the value thereof has not been rewritten, the host data may be read from the main memory 113 after execution of the process in step S1, and the process in step S9 may then be performed. Whether a copy of the host data has been stored into the main memory 113 is determined, by referring to the page table 115 mentioned above.

Here, FIG. 6 illustrates an example of the data structure of the page table 115. As illustrated in FIG. 6, the page table 115 stores storage destination flags and storage destination real addresses associated with page numbers. In other words, each entry (each storage destination flag and each storage destination real address) in the page table 115 is referred to with a page number. Note that the page table 115 is expressed in the form of an array table, for example.

The page numbers are the numbers (identifiers) allocated to pages corresponding to areas of a certain size obtained by dividing the memory area in which a copy of the host data is stored.

Here, in addition to the host data area in which the host data is stored, a swap area for temporarily storing a copy of the host data is set in the storage 12. A storage destination flag indicates whether the data (a copy of the host data) in the page to which the associated page number is allocated is stored in the main memory 113, or is stored in the swap area set in the storage 12.

A storage destination real address indicates the address of the main memory 113 or the storage 12 (swap area) in which the data in the page to which the associated page number is allocated is stored.

Specifically, in a case where the storage destination flag is 0, the storage destination flag indicates that the data in the page to which the associated page number is allocated is stored in the main memory 113. The storage destination real address in this case indicates the address of the main memory 113.

In a case where the storage destination flag is 1, on the other hand, the storage destination flag indicates that the data in the page to which the associated page number is allocated is stored in the swap area set in the storage 12. The storage destination real address in this case indicates the address of the swap area.

In FIG. 6, $N_{page}$ represents the total number of pages. That is, the page table 115 illustrated in FIG. 6 has $N_{page}$ entries. $S_{page}$ represents the page size, and $S_{swap}$ represents the swap size (the size of the swap area). Note that sizes are measured in bytes.

As described above, a virtual address is represented (specified) by a page number and a page offset, and the page number is the value of the higher $\log_2 N_{page}$ bit of the virtual address. In the present embodiment, in this case, the page number can be acquired from the virtual address calculated from the calculation option accompanying the host data (the calculation option included in the metadata attached to the host data) as described above, and it is possible to determine whether the host data is stored in the main memory 113, by referring to the entry (storage destination flag) with the page number in the page table 115.

Also, in FIG. 5 described above, there is free space in the main memory 113 for storing the read data (variable D). However, in a case where the free space does not exist, it is necessary to secure the free space, using the swap area described above.

Figure 7:
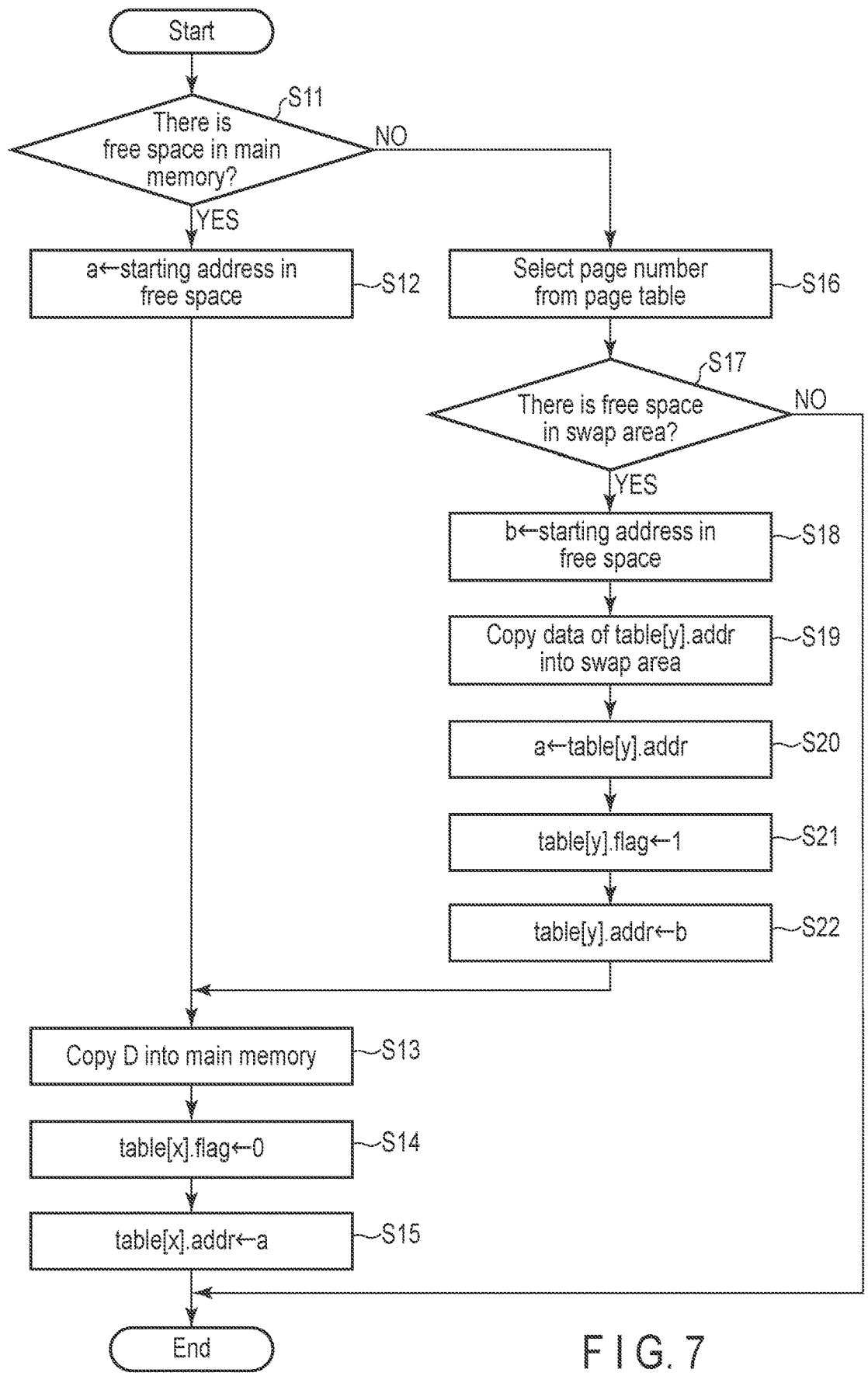
FIG. 7 is a flowchart illustrating an example of a paging algorithm according to the first embodiment.

In the description below, an example of a process (a paging algorithm) for securing free space in the main memory 113 is explained with reference to a flowchart shown in FIG. 7. Note that the process illustrated in FIG. 7 is performed in step S6 shown in FIG. 5.

First, since it is necessary to store the read data (which is the host data designated in an I/O command) into the main memory 113 in step S6 described above with reference to FIG. 5, the memory management unit 116 determines whether there is free space (continuous free space for one page) for storing the read data into the main memory 113 (step S11).

If it is determined that there is free space in the main memory 113 (YES in step S11), the memory management unit 116 stores the first address (real address) of the free space in the main memory 113 into a variable a (step S12).

After the process in step S12 is performed, the memory management unit 116 copies the variable D into the main memory 113, based on the variable a (step S13). In this case, the read data stored in the variable D is stored into the address of the main memory 113 stored in the variable a.

Also, the memory management unit 116 acquires a page number x from the virtual address calculated from the calculation option included in the metadata attached to the read data. The memory management unit 116 sets the value of a storage destination flag (table[x].flag) to 0, the storage destination flag (table[x].flag) being of the entry to be referred to with the acquired page number x (hereinafter referred to as the first target entry) in the page table 115 (step S14).

Further, the memory management unit 116 sets the value of the variable a to the storage destination real address (table[x].addr) of the first target entry (step S15).

If it is determined in step S11 that there is no free space in the main memory 113 (NO in step S11), on the other hand, the memory management unit 116 refers to the page table 115, and selects a page number y for which the value of the storage destination flag is 0 (step S16).

Next, the memory management unit 116 determines whether there is free space (continuous free space for one page) in the swap area set in the storage 12 described above (step S17).

If it is determined that there is free space in the swap area (YES in step S17), the memory management unit 116 stores the first address (real address) of the free space in the swap area into a variable b (step S18).

After the process in step S18 is performed, the memory management unit 116 copies the data (data of one page) stored in the storage destination real address (table[y].addr) of the entry to be referred to with the page number y (hereinafter referred to as the second target entry) in the page table 115, into the address of the swap area stored in the variable b (step S19).

Next, the memory management unit 116 stores the value of the storage destination real address of the second target entry into the variable a (step S20).

Also, the memory management unit 116 sets the value of the storage destination flag (table[y].flag) of the second target entry to 1 (step S21).

Further, the memory management unit 116 sets the value of the variable b to the storage destination real address of the second target entry (step S22).

After the process in step S22 is performed, the process in steps S13 to S15 described above is performed.

According to the process illustrated in FIG. 7, in a case where there is no free space in the main memory 113 into which the variable D is to be copied, the data stored in the main memory 113 is copied into the swap area in the storage 12, so that the variable D can be copied into the memory area in the main memory 113.

Note that, if it is determined in step S17 that there is no free space in the swap area (NO in step S17), the variable D cannot be copied into main memory 113, and therefore, the process illustrated in FIG. 7 comes to an end.

Figure 8:
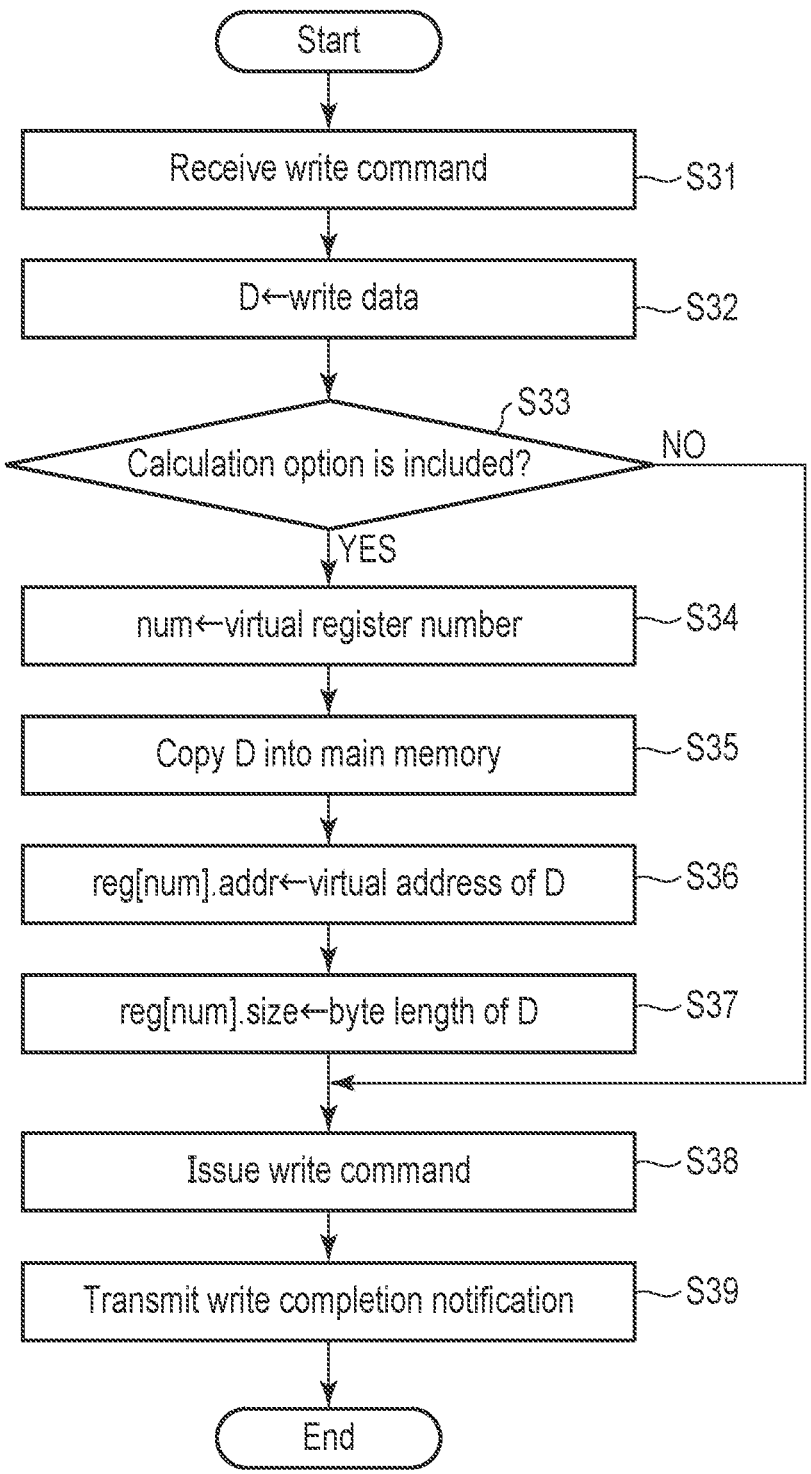
FIG. 8 is a flowchart illustrating an example of processing procedures to be carried out by the accelerator operating in a CwW mode according to the first embodiment.

FIG. 8 is a flowchart illustrating an example of processing procedures to be carried out by the accelerator 11 operating in the CwW mode. The CwW mode is an operation mode for copying, into the main memory 113, host data (write data) designated in a write command from the host 20.

First, the host interface 111 receives a write command (I/O command) from the host 20 (step S31). The write command received in step S31 includes write data, and a logical address to be used to access the write data.

After the process in step S31 is performed, the memory management unit 116 stores the write data included in the write command received in step S31 into a variable D (step S32).

Next, the memory management unit 116 determines whether a calculation option is included in the metadata attached to the write data (step S33).

If it is determined that a calculation option is included in the metadata attached to the write data (YES in step S33), the memory management unit 116 stores the virtual register number calculated based on the calculation option (content identifier) into a variable num (step S34).

Next, the memory management unit 116 copies the variable D (write data) into free space in the main memory 113 (step S35). Although detailed explanation is not made herein, a process similar to the process described above with reference to FIG. 7 is performed in this step S35.

After the process in step S35 is performed, the memory management unit 116 sets, in the virtual register table 114, the virtual address indicating the memory area of the main memory 113 into which the variable D has been copied, as the virtual address corresponding to the variable num (the virtual address to be referred to with the virtual register number stored in the variable num). In other words, the first virtual address of the copy destination of the variable D is set in the virtual address field (reg[num].addr) in the num-th virtual register (step S36).

Further, the memory management unit 116 sets, in the virtual register table 114, the data size of the variable D as the data size corresponding to the variable num (the data size to be referred to with the virtual register number stored in the variable num). In other words, the byte length of the variable D is set in the data size field (reg[num].size) in the num-th virtual register (step S37).

Next, the storage interface 112 issues (transmits) the write command received in step S31 to the storage 12 (step S38).

After the process in step S38 is performed, the write data is written into the storage 12, based on a logical address included in the write command. In this case, the memory management unit 116 receives a write completion notification from the storage 12 via the storage interface 112. The memory management unit 116 transmits the received write completion notification to the host 20 (which is the transmission source of the write command) (step S39).

Note that, if it is determined in step S33 that any calculation option is not included in the metadata attached to the write data (NO in step S33), the process in steps S38 and S39 is performed. That is, in a case where any calculation option is not included in the metadata attached to the write data, a copy of the write data is not stored into the main memory 113.

According to the process described above with reference to FIG. 8, a copy of write data to which metadata including a calculation option is attached can be stored into the main memory 113, based on a write command transmitted from the host 20. The write data copied into the main memory 113 in this manner can be used when the calculation instruction described later is processed.

Figure 9:
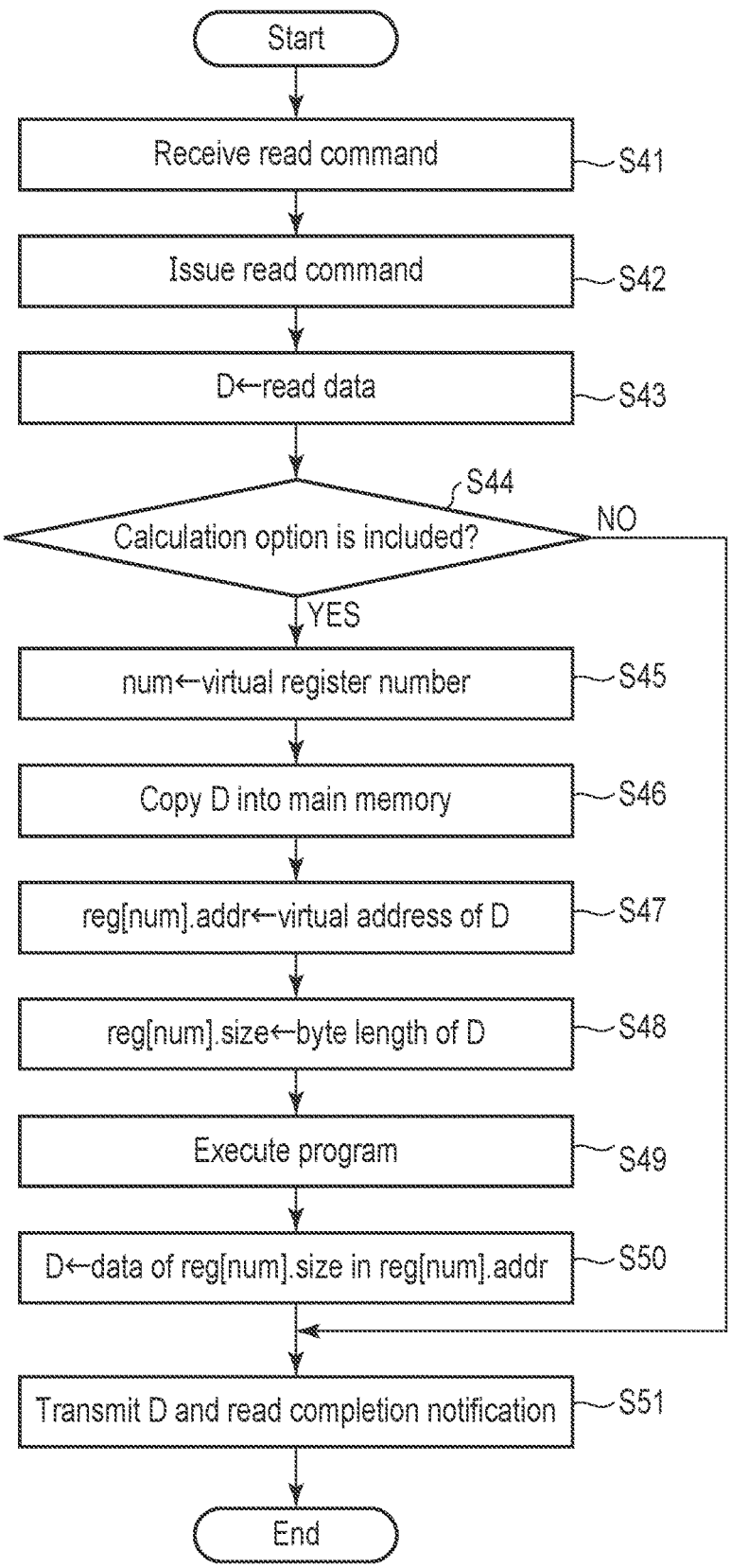
FIG. 9 is a flowchart illustrating an example of processing procedures to be carried out by the accelerator operating in a CoR mode according to the first embodiment.

FIG. 9 is a flowchart illustrating an example of processing procedures to be carried out by the accelerator 11 operating in the CoR mode. The CoR mode is an operation mode for processing a calculation instruction, using host data (read data) designated in a read command from the host 20.

First, the process in steps S41 to S48 corresponding to the process in S1 to S8 described above with reference to FIG. 5 is performed.

Next, the calculation processing unit 117 refers to the virtual register table 114, and executes the program stored in the program register (step S49). Note that the executing the program in step S49 corresponds to processing a calculation instruction using read data. Also, the read data (a TLWE sample) to be the calculation target (the target when a calculation instruction is processed) is read from the CoR register described above.

After the process in step S49 is performed, the data of the result of the processing (which is the result of the processing of the calculation instruction using the read data) in step S49 is stored into a virtual address set in the virtual address field (reg[num].addr) in the num-th virtual register.

In this case, the memory management unit 116 refers to the virtual register table 114, reads data of the byte length (the number of bytes) of the data size set in the data size field (reg[num].size) in the virtual register from the virtual address set in the virtual address field in the num-th virtual register, and copies the read data into the variable D (step S50).

After the process in step S50 is performed, the process in step S51 corresponding to the process in step S9 described above with reference to FIG. 5 is performed.

Note that the end of the program is assumed to be a return instruction (Return num) using the variable num as an argument.

If it is determined in step S44 that any calculation option is not included in the metadata attached to the read data (NO in step S44), the process in step S51 is performed.

According to the process described above with reference to FIG. 9, it is possible to process a calculation instruction based on a read command transmitted from the host 20, and return the result of the processing as read data to the host 20. Also, a copy of the result of processing of the calculation instruction using the read data is stored into the main memory 113.

Figure 10:
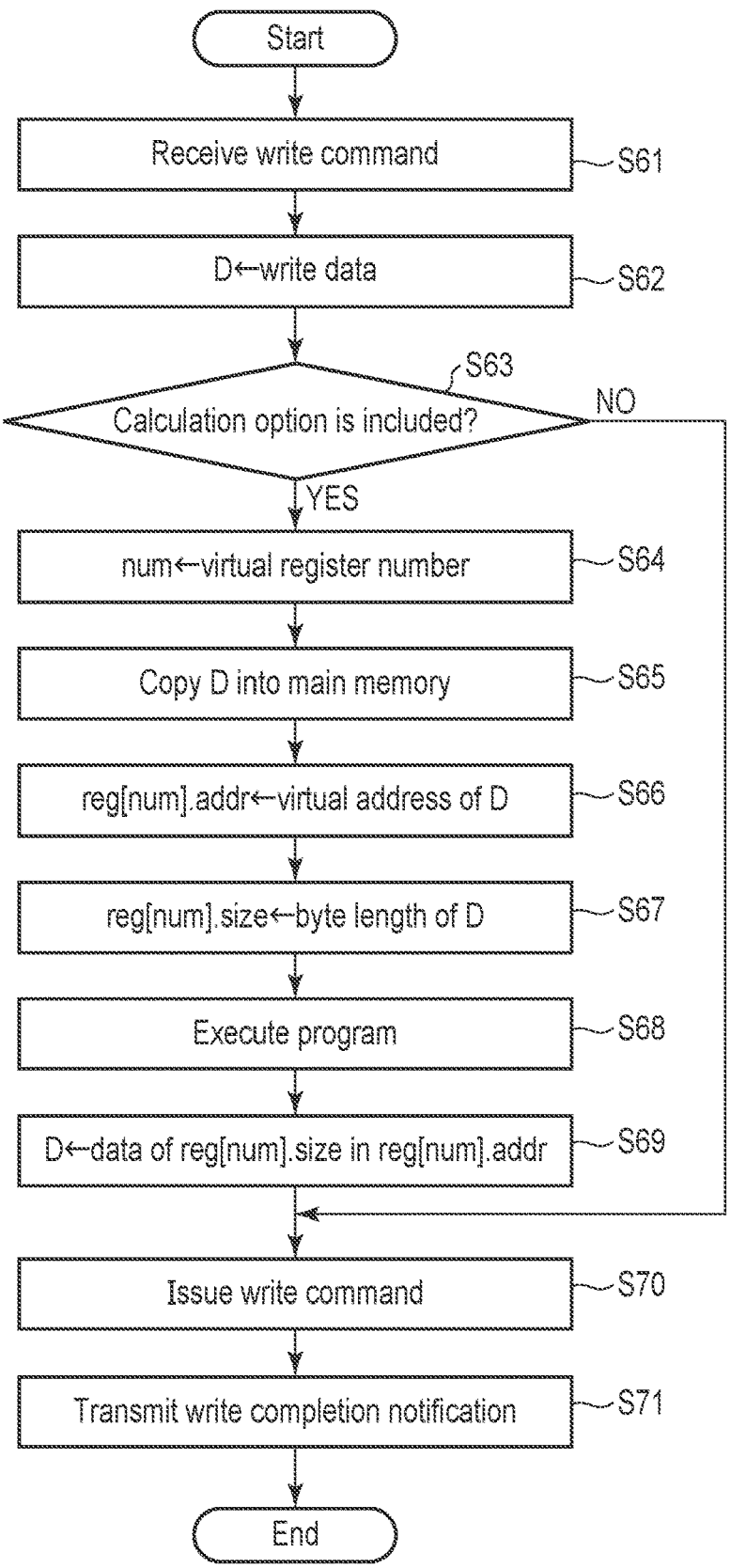
FIG. 10 is a flowchart illustrating an example of processing procedures to be carried out by the accelerator operating in a CoW mode according to the first embodiment.

FIG. 10 is a flowchart illustrating an example of processing procedures to be carried out by the accelerator 11 operating in the CoW mode. The CoW mode is an operation mode for processing a calculation instruction, using host data (write data) designated in a write command from the host 20.

First, the process in steps S61 to S67 corresponding to the process in S31 to S37 described above with reference to FIG. 8 is performed.

Next, the calculation processing unit 117 refers to the virtual register table 114, and executes the program stored in the program register (step S68). Note that the executing the program in step S68 corresponds to processing a calculation instruction using write data. Also, the write data (a TLWE sample) to be the calculation target (the target when a calculation instruction is processed) is read from the CoW register described above.

After the process in step S68 is performed, the data of the result of the processing (which is the result of the processing of the calculation instruction using the write data) in step S68 is stored into a virtual address set in the virtual address field (reg[num].addr) in the num-th virtual register.

In this case, the memory management unit 116 refers to the virtual register table 114, reads data of the byte length (the number of bytes) of the data size set in the data size field (reg[num].size) in the virtual register from the virtual address set in the virtual address field in the num-th virtual register, and copies the data into the variable D (step S69).

After the process in step S69 is performed, the process in steps S70 and S71 corresponding to the process in steps S38 and S39 described above with reference to FIG. 8 is performed. In step S70, a write command (a write command for the variable D) including the variable D as the write data is transmitted to the storage 12.

Note that the end of the program is assumed to be a return instruction (Return num) using the variable num as an argument.

If it is determined in step S63 that any calculation option is not included in the metadata attached to the write data (NO in step S63), the process in steps S70 and S71 is performed.

According to the process described above with reference to FIG. 10, it is possible to process a calculation instruction based on a write command transmitted from the host 20, and write the result of the processing as write data into the storage 12. Also, a copy of the result of processing of a calculation instruction using the write data is stored into the main memory 113.

As described above, the accelerator 11 according to the present embodiment operates in each of the CwR mode, the CwW mode, the CoR mode, and the CoW mode, but the operation mode of the accelerator 11 is designed in a calculation option.

Specifically, in a case where a read command is received from the host 20, and the Type of the calculation option included in the metadata attached to the read data is TLWE-CoW, the operation mode of the accelerator 11 is the CwR mode.

Further, in a case where a write command is received from the host 20, and the Type of the calculation option included in the metadata attached to the write data is TLWE-CoR, the operation mode of the accelerator 11 is the CwW mode.

Further, in a case where a read command is received from the host 20, and the Type of the calculation option included in the metadata attached to the read data is TLWE-CoR, the operation mode of the accelerator 11 is the CoR mode.

Further, in a case where a write command is received from the host 20, and the Type of the calculation option included in the metadata attached to the write data is TLWE-CoW, the operation mode of the accelerator 11 is the CoW mode.

In the description below, calculation instructions according to the present embodiment are specifically described. An example of calculation instructions according to the present embodiment are secret calculation instructions.

FIG. 11 illustrates an example of an instruction set of secret calculation instructions that are used by the accelerator 11 according to the present embodiment. In the example illustrated in FIG. 11, the instruction set of secret calculation instructions includes a Return instruction, a Move instruction, a Push instruction, a Pop instruction, a Bootstrap instruction, an Add instruction, a Sub instruction, and an IntMult instruction indicated by command types 0 to 7. In FIG. 11, for convenience, virtual register numbers for referring to the ciphertext registers are shown as ciphertext register numbers, and a virtual register number for referring to the LUT register is shown as a LUT register number.

The Return instruction has a ciphertext register number num as an argument. According to the Return instruction, the value of the ciphertext register to be referred to with the ciphertext register number num is transmitted to the host 20 or the storage 12. Note that the value of the ciphertext register is transmitted to the host 20 in a case where the ciphertext register is the CoR register, and is transmitted to the storage 12 in a case where the ciphertext register is the CoW register. Note that, after the value of the ciphertext register is transmitted, the values of not only the ciphertext register to be referred to with the ciphertext register number num but also all the ciphertext registers corresponding to the same Key ID as that of the ciphertext register are cleared, and the stack pointer for managing the reference position in the stack area included in the virtual address space is set to 0.

The Move instruction has ciphertext register numbers num1 and num2 as arguments. According to the Move instruction, the value of the ciphertext register to be referred to with the ciphertext register number num1 is copied into the ciphertext register to be referred to with the ciphertext register number num2.

The Push instruction has the ciphertext register number num as an argument. According to the Push instruction, the value of the ciphertext register to be referred to with the ciphertext register number num is copied into the top of the stack area included in the virtual address space, and the stack pointer is decremented ("1" is subtracted from the value of the stack pointer).

The Pop instruction has the ciphertext register number num as an argument. According to the Pop instruction, the value of the top of the stack area included in the virtual address space is copied into the ciphertext register to be referred to with the ciphertext register number num, and the stack pointer is incremented ("1" is added to the value of the stack pointer).

The Bootstrap instruction has a LUT register number num1 and the ciphertext register number num2 as arguments. According to the Bootstrap instruction, GBS or PBS for the value of the ciphertext register to be referred to with the ciphertext register number num2 is performed using the LUT register to be referred to with the LUT register number num1. GBS is performed when the LUT register number num1=0, and PBS is performed when the LUT register number num1>0. The result (output value) of execution of the GBS or PBS is copied into the ciphertext register to be referred to with the ciphertext register number num2. For example, in a case where the value of the LUT register to be referred to with the LUT register number num1 is a LUT for a function f(x), and the value of the ciphertext register to be referred to with the ciphertext register number num2 before execution of the Bootstrap instruction is a TLWE sample for x, the value of the ciphertext register to be referred to with the ciphertext register number num2 after the execution of the Bootstrap instruction is a TLWE sample for f(x).

The Add instruction has the ciphertext register numbers num1 and num2 as arguments. According to the Add instruction, for each component, the value of the ciphertext register to be referred to with the ciphertext register number num1 and the value of the ciphertext register to be referred to with the ciphertext register number num2 are added, and the result of the addition (calculation result) is copied into the ciphertext register to be referred to with the ciphertext register number num1.

The Sub instruction has the ciphertext register numbers num1 and num2 as arguments. According to the Sub instruction, for each component, the value of the ciphertext register to be referred to with the ciphertext register number num2 is subtracted from the value of the ciphertext register to be referred to with the ciphertext register number num1, and the result of the subtraction (calculation result) is copied into the ciphertext register to be referred to with the ciphertext register number num1.

The IntMult instruction has the ciphertext register number num and an integer value val as arguments. According to the IntMult instruction, for each component, the value of the ciphertext register to be referred to with the ciphertext register number num is multiplied by the integer value val, and the result of the multiplication (calculation result) is copied into the ciphertext register to be referred to with the ciphertext register number num1.

Here, FIG. 12 illustrates an example of a program using the instruction set of secret calculation instructions described above (which is a sequence of secret calculation instructions). In FIG. 12, secret calculation instructions and arguments of the secret calculation instructions are arranged in the order of execution of the secret calculation instructions.

Further, FIG. 13 illustrates an example of the LUTs (the values of the LUT registers) to be used by the program illustrated in FIG. 12. FIG. 13 indicates that the LUT (data) of a LUT register LR1 is $f_1(x)=x^2$, and the LUT (data) of a LUT register LR2 is $f_2(x)=4/x$. That is, it is assumed that two kinds of functions, $f_1(x)=x^2$ and $f_2(x)=4/x$, are used as the LUTs herein.

Note that it is assumed that the program illustrated in FIG. 12 and the LUTs illustrated in FIG. 13 are set beforehand in the program register and the LUT registers.

According to the program illustrated in FIG. 12 and the LUTs illustrated in FIG. 13, the product $xy=f_2(f_1(x+y)-f_2(x-y))$ of a plaintext is calculated in an encrypted state.

Methods for executing the program illustrated in FIG. 12 described above are now briefly described. A method for executing the program in the CoR mode and a method for executing the program in the CoW mode are described separately herein.

First, the method for executing the program in the CoR mode is described. In this case, the host 20 issues a read command to read a TLWE sample corresponding to a plaintext value x that designates Type=TLWE-CoW, Key ID=k, and Data ID=1 as calculation options, and a secret key s. Operating in the CwR mode based on the calculation option (Type=TLWE-CoW), the accelerator 11 reads the TLWE sample from the storage 12, transmits the TLWE sample to the host 20, and stores a copy of the TLWE sample into the ciphertext register CR1 (the ciphertext register to be referred to with the virtual register number calculated from Type=TLWE-CoW, Key ID=k, and Data ID=1).

Further, the host 20 issues a read command to read a TLWE sample corresponding to a plaintext value y that designates Type=TLWE-CoR, Key ID=k, and Data ID=2 as calculation options, and the secret key s. Operating in the CoR mode based on the calculation option (Type=TLWE-CoR), the accelerator 11 reads the TLWE sample from the storage 12, stores a copy of the TLWE sample into the ciphertext register CR2 (the ciphertext register to be referred to with the virtual register number calculated from Type=TLWE-CoR, Key ID=k, and Data ID=2), and executes the program stored in the program register. The result (TLWE sample) of execution of the program is stored into a ciphertext register CR0, and the accelerator 11 transmits the TLWE sample in the ciphertext register CR0 to the host 20.

In a case where the program illustrated in FIG. 12 is executed in the CoR mode as described above, the accelerator 11 operates in the CwR mode to store the TLWE sample corresponding to the plaintext value x and the secret key s into the ciphertext register CR1, then operates in the CoR mode to store the TLWE sample corresponding to the plaintext value y and the secret key s into the ciphertext register CR2, and then executes the program. In this manner, the result of calculation of the plaintext product $xy=f_2(f_1(x+y)-f_2(x-y))$ in an encrypted state (the result of processing of secret calculation instructions) can be transmitted to the host 20 as described above.

Next, the method for executing the program in the CoW mode is described. In this case, the host 20 issues a write command to write a TLWE sample corresponding to a plaintext value x that designates Type=TLWE-CoR, Key ID=k, and Data ID=1 as calculation options, and a secret key s. Operating in the CwW mode based on the calculation option (Type=TLWE-CoR), the accelerator 11 stores a copy of the TLWE sample into the ciphertext register CR1 (the ciphertext register to be referred to with the virtual register number calculated from Type=TLWE-CoR, Key ID=k, and Data ID=1), and writes the TLWE sample into the storage 12.

Next, the host 20 issues a write command to write a TLWE sample corresponding to a plaintext value y that designates Type=TLWE-CoW, Key ID=k, and Data ID=2 as calculation options, and the secret key s. Operating in the CoW mode based on the calculation option (Type=TLWE-CoW), the accelerator 11 stores a copy of the TLWE sample into the ciphertext register CR2 (the ciphertext register to be referred to with the virtual register number calculated from Type=TLWE-CoR, Key ID=k, and Data ID=2), and executes the program stored in the program register. The result (TLWE sample) of execution of the program is stored into the ciphertext register CR0, and the accelerator 11 writes the TLWE sample stored in the ciphertext register CR0 into the storage 12.

In a case where the program illustrated in FIG. 12 is executed in the CoW mode as described above, the accelerator 11 operates in the CwW mode to store the TLWE sample corresponding to the plaintext value x and the secret key s into the ciphertext register CR1, then operates in the CoW mode to store the TLWE sample corresponding to the plaintext value y and the secret key s into the ciphertext register CR2, and then executes the program. In this manner, the result of calculation of the plaintext product $xy=f_2(f_1(x+y)-f_2(x-y))$ in an encrypted state (the result of processing of secret calculation instructions) can be written into the storage 12 as described above.

Note that FIG. 14 illustrates the states of the ciphertext registers CR0, CR1, and CR2 immediately before the above program is executed. Further, FIG. 15 illustrates the state transitions of the ciphertext registers and the stack (area) in a case where the program (secret calculation instructions) illustrated in FIG. 12 is executed with reference to the ciphertext registers CR0, CR1, and CR2 illustrated in FIG. 14. In the example illustrated in FIG. 15, the value (xy) of the ciphertext register CR0 after the Bootstrap instruction "bootstrap 2,0" is executed corresponds to the result of processing of secret calculation instructions (the result of execution of the program). Note that, in FIG. 15, a downward arrow indicates that the value does not change before and after execution of the secret calculation instructions.

As described above, the accelerator 11 according to the present embodiment corresponds to a controller that controls the computing storage device (CSD) 10 connectable to the host 20, and includes the host interface 111 (first interface) that receives an I/O command designating host data (first host data) from the host 20, the storage interface 112 (second interface) that transmits and receives the host data to and from the storage 12, and the main memory (memory) 113 to be used for storing a copy of the host data designated in the I/O command. Further, the accelerator 11 includes the virtual register table 114 and the page table. The virtual register table 114 stores virtual addresses represented by the page numbers allocated to the pages storing the data to be used to process calculation instructions in accordance with calculation options and the page offsets, and the sizes of the data. The virtual addresses and the data sizes are associated with the respective virtual register numbers to be identified (calculated) based on the calculation options accompanying the host data. The page table 115 stores the flags indicating the storage destinations of the data and the real addresses of the storage destinations. The flags and the real addresses are associated with the respective page numbers. The accelerator 11 stores a copy of the host data designated in an I/O command by referring to the page table 115 into the main memory 113, updates the virtual register table 114, and processes calculation instructions using the host data designated in the I/O command by referring to the virtual register table 114.

In the present embodiment, with the configuration described above, it is possible to appropriately control the computing storage device (CSD) 10 for a use case of processing secret calculation instructions, for example.

Also, in the present embodiment, the ciphertexts (TLWE samples) in the respective ciphertext registers are stored in the main memory 113, and therefore, there is a possibility that the free space in the main memory 113 might be insufficient (that is, the ciphertexts cannot be completely stored in the main memory 113). To counter this, the storage 12 according to the present embodiment includes the host data area (first area) for storing host data, and the swap area (second area) for temporarily storing a copy of the host data stored in the main memory 113. With this configuration, in a case where the free space in the main memory 113 for storing a copy of the host data designated in an I/O command is insufficient, the accelerator 11 (the memory management unit 116) stores, into the swap area, the copy of the host data (second host data) stored in the memory area (third area) in the main memory 113, and stores the copy of the host data designated in the I/O command into the memory area (third area) in the main memory 113. In the present embodiment, the storage 12 is used as the swap destination of the main memory 113 of the accelerator 11 as described above, and thus, efficient memory management can be performed.

Note that, for example, in a case where the main memory 113 has a sufficient memory area for storing the ciphertext (TLWE sample) of each of the ciphertext registers, it is also possible to adopt a configuration in which the swap area is not set in the storage 12. Further, in a case where the swap area is not used, the virtual addresses can be the same as the real addresses in the main memory. In this case, the accelerator 11 may have a configuration from which the page table 115 is excluded.

Further, the accelerator 11 according to the present embodiment operates in the CwR mode, the CwW mode, the CoR mode, and the CoW mode.

Specifically, the accelerator 11 operating in the CwR mode copies, into the main memory 113, the host data (read data) read from the storage 12 based on a read command, and sets the virtual address of the copy destination and the data size of the host data in the virtual register table 114, associating the virtual address and the data size with the virtual register number identified based on a calculation option.

Meanwhile, the accelerator 11 operating in the CwW mode copies, into the main memory 113, the host data (write data) to be written into the storage 12 based on a write command, and sets the virtual address of the copy destination and the data size of the host data in the virtual register table 114, associating the virtual address and the data size with the virtual register number identified based on a calculation option.

Further, the accelerator 11 operating in the CoR mode copies, into the main memory 113, the host data (read data) read from the storage 12 based on a read command, sets the virtual address of the copy destination and the data size of the host data in the virtual register table 114 while associating the copy destination and the data size with the virtual register number identified based on a calculation option, and executes a preset program (stored in the program register being managed by the virtual register table 114), to process calculation instructions using the host data copied into the main memory 113. Note that the result of the processing of the calculation instructions in this case is transmitted to the host 20 by the host interface 111.

Meanwhile, the accelerator 11 operating in the CoW mode copies, into the main memory 113, the host data (write data) to be written into the storage 12 based on a write command, sets the virtual address of the copy destination and the data size of the host data in the virtual register table 114 while associating the copy destination and the data size with the virtual register number identified based on a calculation option, and executes a preset program (stored in the program register being managed by the virtual register table 114), to process calculation instructions using the host data copied into the main memory 113. The result of the processing of the calculation instructions in this case is transmitted to the storage 12 by the storage interface 112 (in other words, the result is written into the storage 12).

In the present embodiment, the accelerator 11 operates in accordance with each of the above operation modes (the CwR mode, the CwW mode, the CoR mode, and the CoW mode), so that appropriate computing storage control can be performed.

Although a case where calculation instructions are secret calculation instructions in the present embodiment has been mainly described, the calculation instructions may be instructions other than secret calculation instructions.

In the present embodiment, a case where the accelerator 11 operates according to each of the CwR mode, the CwW mode, the CoR mode, and the CoW mode has been described. However, in a case where the host data is not accompanied by any calculation option (for example, any calculation option is not included in the metadata attached to the host data), for example, a copy of the host data is not stored into the main memory 113, and processing of calculation instructions using the host data is not performed. Specifically, in a case where any calculation option does not accompany the read data designated in a read command received from the host 20, it is sufficient to perform a process of transmitting the read data read from the storage 12 based on the read command to the host 20. Also, in a case where any calculation option does not accompany the write data designated in a write command received from the host 20, it is sufficient to perform a process without writing the write data into the storage 12 based on the write command.

Meanwhile, the storage 12 included in the CSD 10 according to the present embodiment is assumed to be, for example, a solid state drive (SSD) 120 including a NAND flash memory 121 as a nonvolatile memory as illustrated in FIG. 16. In this case, the CSD 10 is designed to be connectable to the host 20 via a system bus such as a Peripheral Component Interconnect Express (PCIe) bus, for example. Also, for example, Non-Volatile Memory Express (NVMe) is adopted as a communication protocol between the CSD 10 and the host 20. In other words, the CSD 10 (the host interface 111) is designed to be connectable to the host 20 (to perform communication with the host 20) based on the NVMe standard. In this case, the host 20 includes a device called a root complex having a PCIe port in addition to a CPU, a RAM, and the like. Further, the host interface 111 and the storage interface 112 in the accelerator 11 include a PCIe interface that performs processing according to the PCIe standard, and an NVMe processing unit that performs processing according to the NVMe standard. In this case, the I/O commands (read commands and write commands) described in the present embodiment correspond to commands (NVMe Read commands and NVMe Write commands) conforming to the NVMe standard. Further, the host data and the metadata attached to the host data described in the present embodiment correspond to NVMe data and NVMe metadata, respectively.

Although it is assumed in FIG. 16 that an SSD controller is disposed inside the SSD 120 (in other words, the accelerator 11 is located outside the SSD controller), the accelerator 11 according to the present embodiment may be disposed inside the SSD controller.

Figure 17:
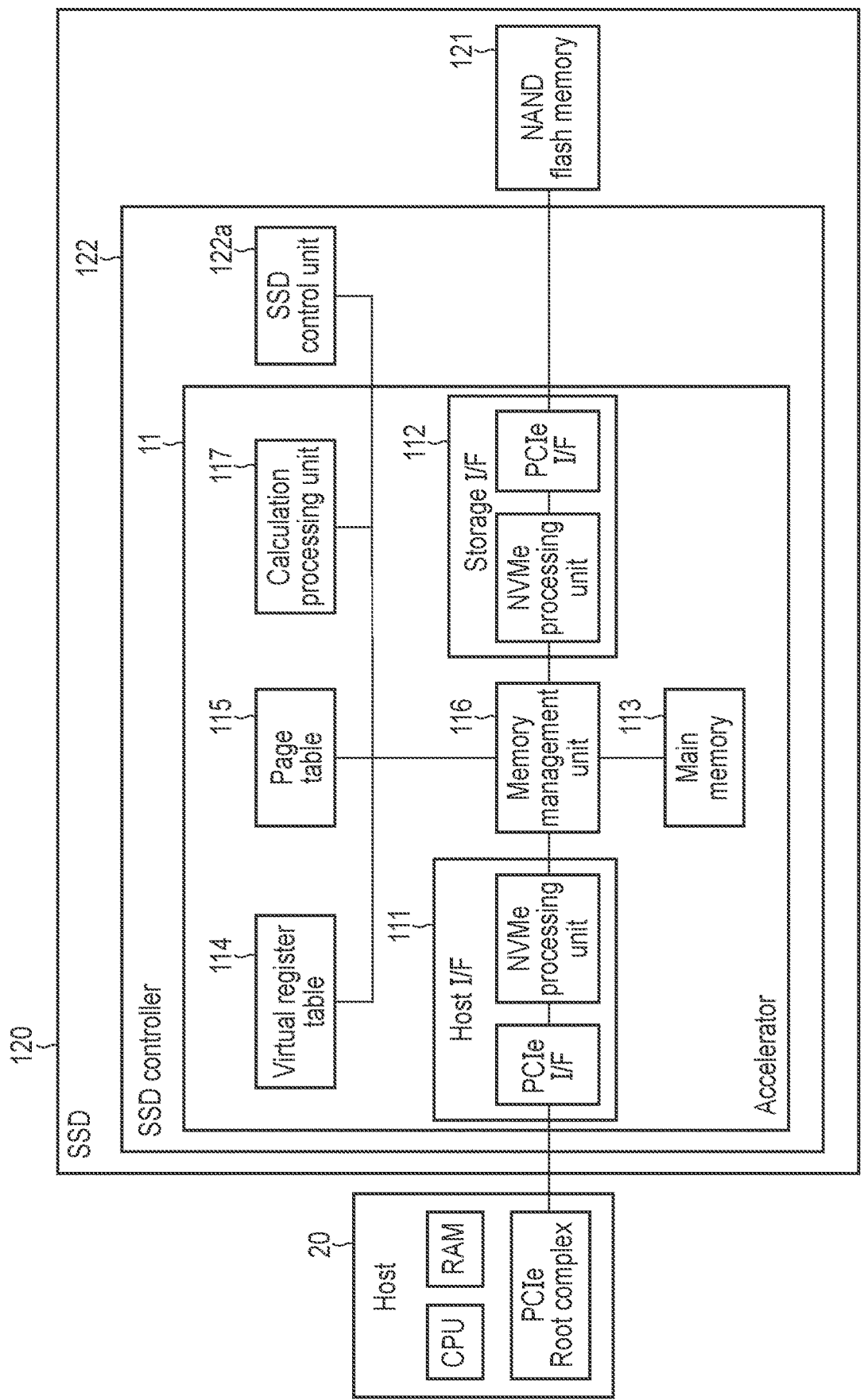
FIG. 17 is a diagram for explaining a configuration in which the accelerator according to the first embodiment is disposed inside an SSD controller.

FIG. 17 illustrates an example of a configuration in which the accelerator 11 is disposed inside the SSD controller. According to the example illustrated in FIG. 17, the SSD 120 includes the NAND flash memory 121 and an SSD controller 122. The SSD controller 122 includes the accelerator 11 and an SSD control unit 122a. The SSD control unit 122a has a function of controlling operation of the SSD 120. It is safe to say that the SSD 120 in the example illustrated in FIG. 17 corresponds to the CSD 10 described in the present embodiment. In the case of the configuration illustrated in FIG. 17, the SSD 120 may also be referred to as the memory system, and the SSD controller 122 may also be referred to as the memory controller.

Further, as illustrated in FIG. 18, the CSD 10 may be designed to be connectable to the host 20 via a network 30. In this case, for example, an NVMe over Fabric (NVMe-oF) is used as the communication protocol between the CSD 10 and the host 20, and the accelerator 11 is disposed inside the NVMe-oF target module of the CSD 10. In other words, the accelerator 11 is designed to be connectable to the host 20 via a network in accordance with the NVMe-oF standard. Note that, in the example illustrated in FIG. 18, the host interface 111 in the accelerator 11 includes a network interface card (NIC) and an NVMe-oF processing unit that performs processing conforming to the NVMe-oF standard. Also, in the example illustrated in FIG. 18, the storage 12 includes a plurality of SSDs 120, and the storage interface 112 includes a PCIe switch that performs switching for the SSDs 120.

Note that FIGS. 16 to 18 described above were prepared for explaining example applications of the accelerator 11 according to the present embodiment, and therefore, the configurations illustrated in FIGS. 16 to 18 may be changed as appropriate.

Second Embodiment

Next, a second embodiment is described. In the present embodiment, the aspects similar to those of the first embodiment described above are not described in detail, but aspects different from those of the first embodiment are mainly described. Further, since the configuration of an accelerator (controller) according to the present embodiment is similar to that of the first embodiment described above, the configuration of the accelerator is described with reference to FIG. 1 as appropriate.

In the first embodiment described above, a case where calculation options are included in the metadata (NVMe metadata) attached to host data (NVMe data) has been described. However, the present embodiment differs from the first embodiment in that calculation options are included in the host data (in other words, calculation options are designated as host data).

In the description below, an operation of an accelerator 11 according to the present embodiment is explained. The accelerator 11 according to the present embodiment operates in each of the CwR mode, the CwW mode, the CoR mode, and the CoW mode, as in the first embodiment described above.

Note that, in a case where calculation options accompany host data in the present embodiment, it is assumed that the calculation options (which are host data that are calculation options) are designated as host data in I/O commands (a read command and a write command), and host data (which is host data that is not calculation options) accompanied by the calculation options is then designated.

Further, the recvCalcOption to be used in the following process by the accelerator 11 is set to False at the time of system activation (in other words, the initial value of recvCalcOption is False). Note that recvCalcOption is information corresponding to a flag indicating whether a calculation option has been received, and is held in a memory management unit 116, for example.

FIG. 19 is a flowchart illustrating an example of processing procedures to be carried out by the accelerator 11 operating in the CwR mode.

First, the process in steps S81 to S83 corresponding to the process in S1 to S3 described above with reference to FIG. 5 is performed.

Next, the memory management unit 116 determines whether the read data (which is the variable D) is a calculation option (in other words, a calculation option is designated as the read data) (step S84).

If it is determined that the read data is a calculation option (YES in step S84), the memory management unit 116 stores the virtual register number calculated based on the calculation option (content identifier) into a variable num (step S85).

Also, the memory management unit 116 sets the value of recvCalcOption described above to True (step S86).

After the process in step S86 is performed, the process in step S87 corresponding to the process in step S9 described above with reference to FIG. 5 is performed.

If it is determined in step S84 that the read data is not a calculation option (NO in step S84), on the other hand, the memory management unit 116 determines whether the value of recvCalcOption is True (step S88). Note that, if it is determined in step S88 that the value of recvCalcOption is True, it is obvious that a calculation option has already been received, and the current variable D is the read data designated immediately after (the read data that is) the calculation option (in other words, the read data is host data accompanied by a calculation option).

If the value of recvCalcOption is True (YES in step S88), the process in steps S89 to S91 corresponding to the process in steps S6 to S8 illustrated in FIG. 5 is performed.

After the process in step S91 is performed, the memory management unit 116 sets the value of recvCalcOption to False (step S92). After the process in step S92 is performed, the process in step S87 is performed.

Note that, if it is determined that the value of recvCalcOption is not True (which is False) (NO in step S88), the variable D (read data) is not host data accompanied by a calculation option, and therefore, the process in step S87 is performed.

As described above, according to the process illustrated in FIG. 19, in a case where read data that is a calculation option is designated in a read command, the virtual register number calculated from the calculation option is stored into the variable num. Next, in a case where read data that is not a calculation option (host data accompanied by a calculation option) is designated in a read command, the read data is stored into a main memory 113, and the virtual address field and the data size field (which is a virtual register table 114) in the virtual register to be referred to with (the virtual register number stored in) the variable num can be updated.

Figure 20:
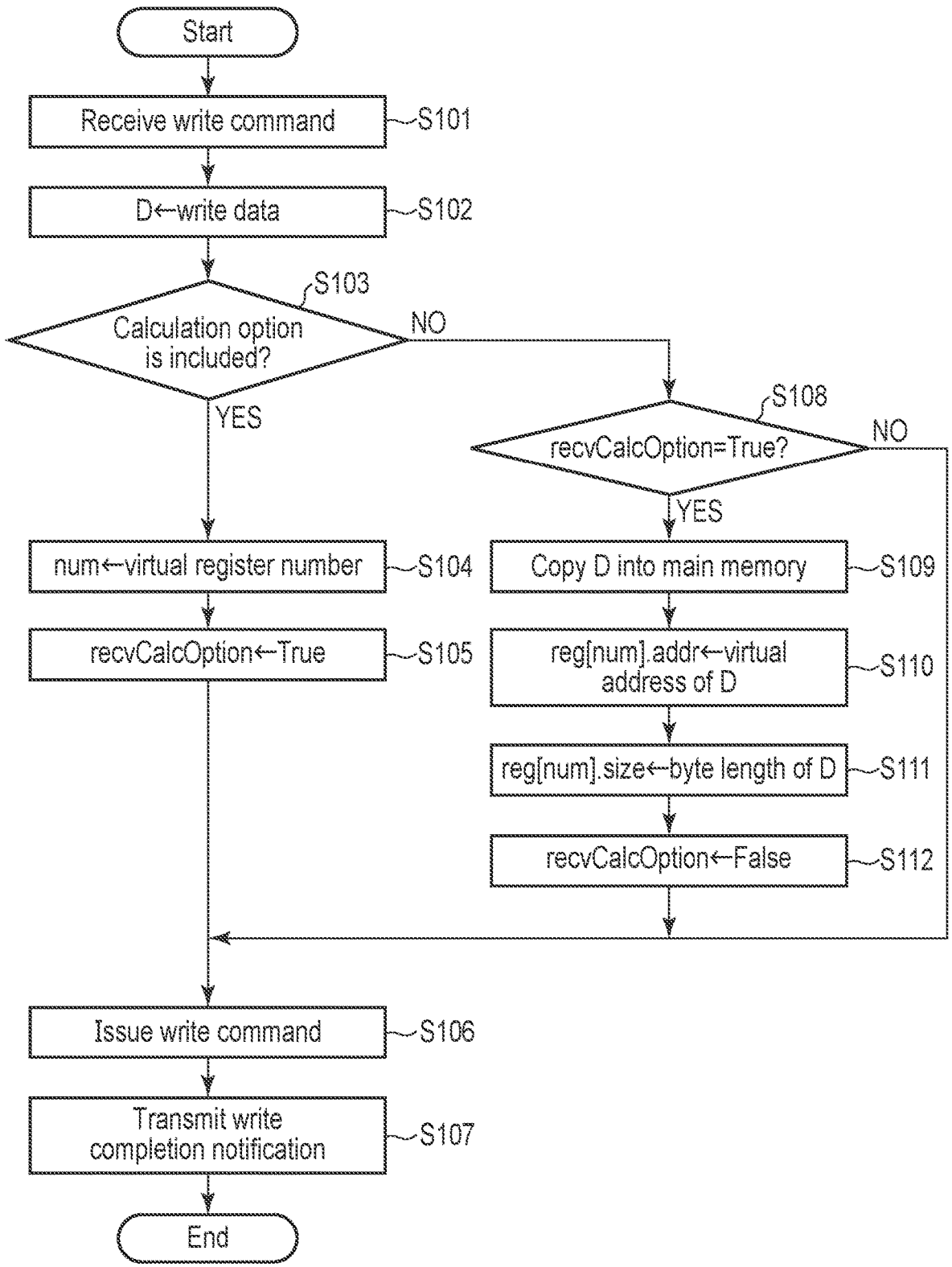
FIG. 20 is a flowchart illustrating an example of processing procedures to be carried out by the accelerator operating in a CwW mode according to the second embodiment.

FIG. 20 is a flowchart illustrating an example of processing procedures to be carried out by the accelerator 11 operating in the CwW mode.

First, the process in steps S101 and S102 corresponding to the process in S31 and S32 described above with reference to FIG. 8 is performed.

Next, the memory management unit 116 determines whether the write data (which is the variable D) is a calculation option (in other words, a calculation option is designated as the write data) (step S103).

If it is determined that the write data is a calculation option (YES in step S103), the memory management unit 116 stores the virtual register number calculated based on the calculation option (content identifier) into a variable num (step S104).

Also, the memory management unit 116 sets the value of recvCalcOption described above to True (step S105).

After the process in step S105 is performed, the process in steps S106 and S107 corresponding to the process in steps S38 and S39 described above with reference to FIG. 8 is performed.

If it is determined in step S103 that the write data is not a calculation option (NO in step S103), on the other hand, the memory management unit 116 determines whether the value of recvCalcOption is True (step S108). Note that, if it is determined in step S108 that the value of recvCalcOption is True, it is obvious that a calculation option has already been received, and the current variable D is the write data designated immediately after (the write data that is) the calculation option (in other words, the write data is host data accompanied by a calculation option).

If the value of recvCalcOption is True (YES in step S108), the process in steps S109 to S111 corresponding to the process in steps S35 to S37 illustrated in FIG. 8 is performed.

After the process in step S111 is performed, the memory management unit 116 sets the value of recvCalcOption to False (step S112). After the process in step S112 is performed, the process in steps S106 and S107 is performed.

Note that, if it is determined that the value of recvCalcOption is not True (which is False) (NO in step S108), the variable D (write data) is not host data accompanied by a calculation option, and therefore, the process in steps S106 and S107 is performed.

As described above, according to the process illustrated in FIG. 20, in a case where write data that is a calculation option is designated in a write command, the virtual register number calculated from the calculation option is stored into the variable num. Next, in a case where write data that is not a calculation option (host data accompanied by a calculation option) is designated in a write command, the write data is stored into the main memory 113, and the virtual address field and the data size field (which is the virtual register table 114) in the virtual register to be referred to with (the virtual register number stored in) the variable num can be updated.

Figure 21:
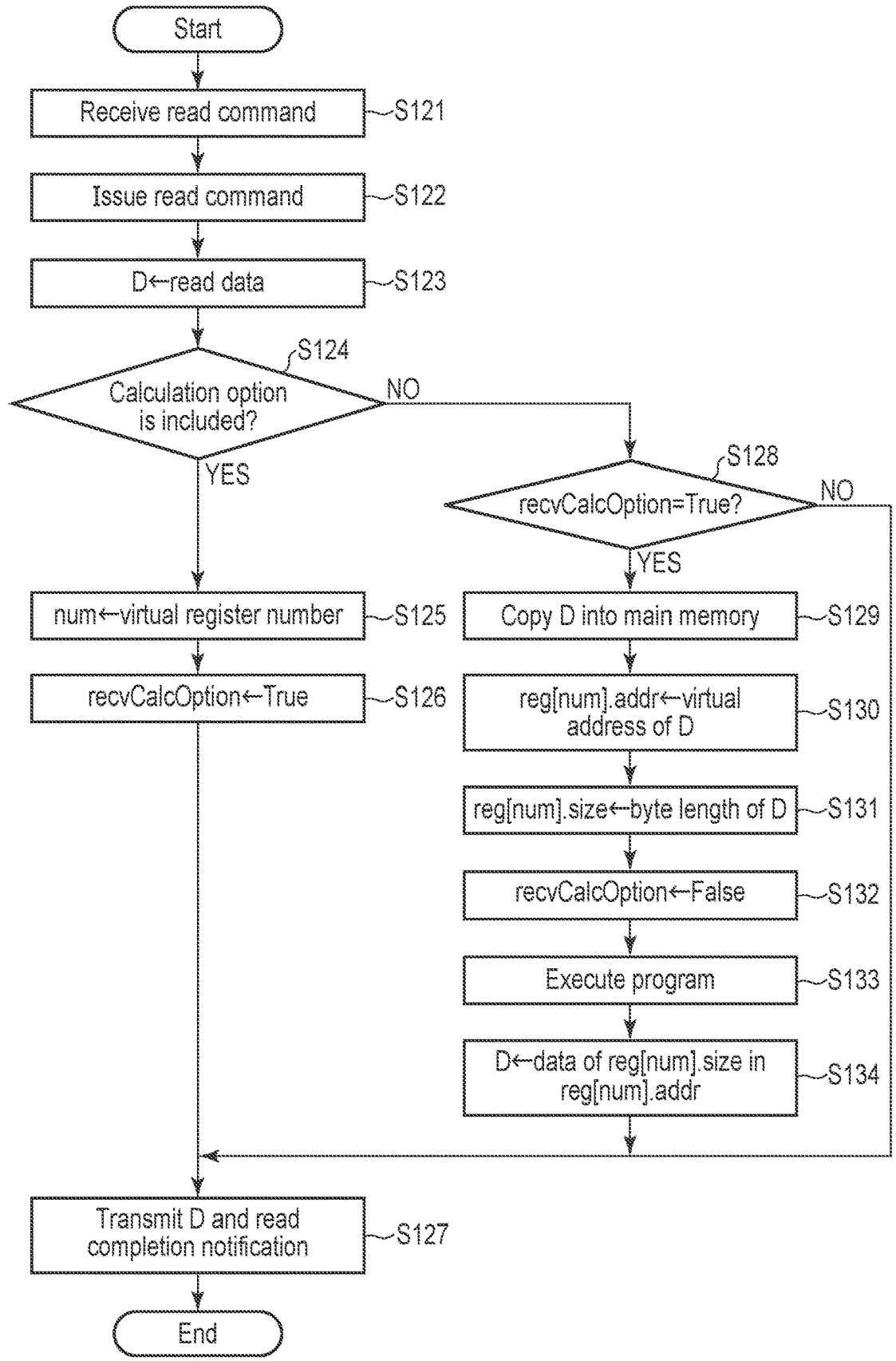
FIG. 21 is a flowchart illustrating an example of processing procedures to be carried out by the accelerator operating in a CoR mode according to the second embodiment.

FIG. 21 is a flowchart illustrating an example of processing procedures to be carried out by the accelerator 11 operating in the CoR mode.

First, the process in steps S121 to S124 corresponding to the process in S81 to S84 described above with reference to FIG. 19 is performed.

If it is determined in step S124 that the read data (which is the variable D) is a calculation option (YES in step S124), the process in steps S125 to S127 corresponding to the process in steps S85 to S87 illustrated in FIG. 19 described above is performed.

If it is determined that the read data is not a calculation option (NO in step S124), on the other hand, the process in step S128 corresponding to the process in step S88 illustrated in FIG. 19 described above is performed.

If it is determined in step S128 that the value of recvCalcOption is True (YES in step S128), the process in steps S129 to S132 corresponding to the process in steps S89 to S92 illustrated in FIG. 19 described above is performed.

Next, a calculation processing unit 117 refers to the virtual register table 114, and executes the program stored in the program register (step S133).

After the process in step S133 is performed, the memory management unit 116 refers to the virtual register table 114, reads data of the byte length (the number of bytes) of the data size set in the data size field (reg[num].size) in the virtual register from the virtual address set in the virtual address field (reg[num].addr) in the num-th virtual register, and copies the data into the variable D (step S134).

The process in steps S133 and S134 described above is similar to the process in steps S49 and S50 illustrated in FIG. 9 described above. After the process in step S134 is performed, the process in step S127 is performed.

Note that, if it is determined that the value of recvCalcOption is not True (which is False) (NO in step S128), the variable D (read data) is not host data accompanied by a calculation option, and therefore, the process in step S127 is performed.

As described above, according to the process illustrated in FIG. 21, in a case where read data that is a calculation option is designated in a read command, the virtual register number calculated from the calculation option is stored into the variable num. Next, in a case where read data that is not a calculation option (host data accompanied by a calculation option) is designated in a read command, calculation instructions are processed with the read data, and the result of the processing can be returned as read data to a host 20.

Figure 22:
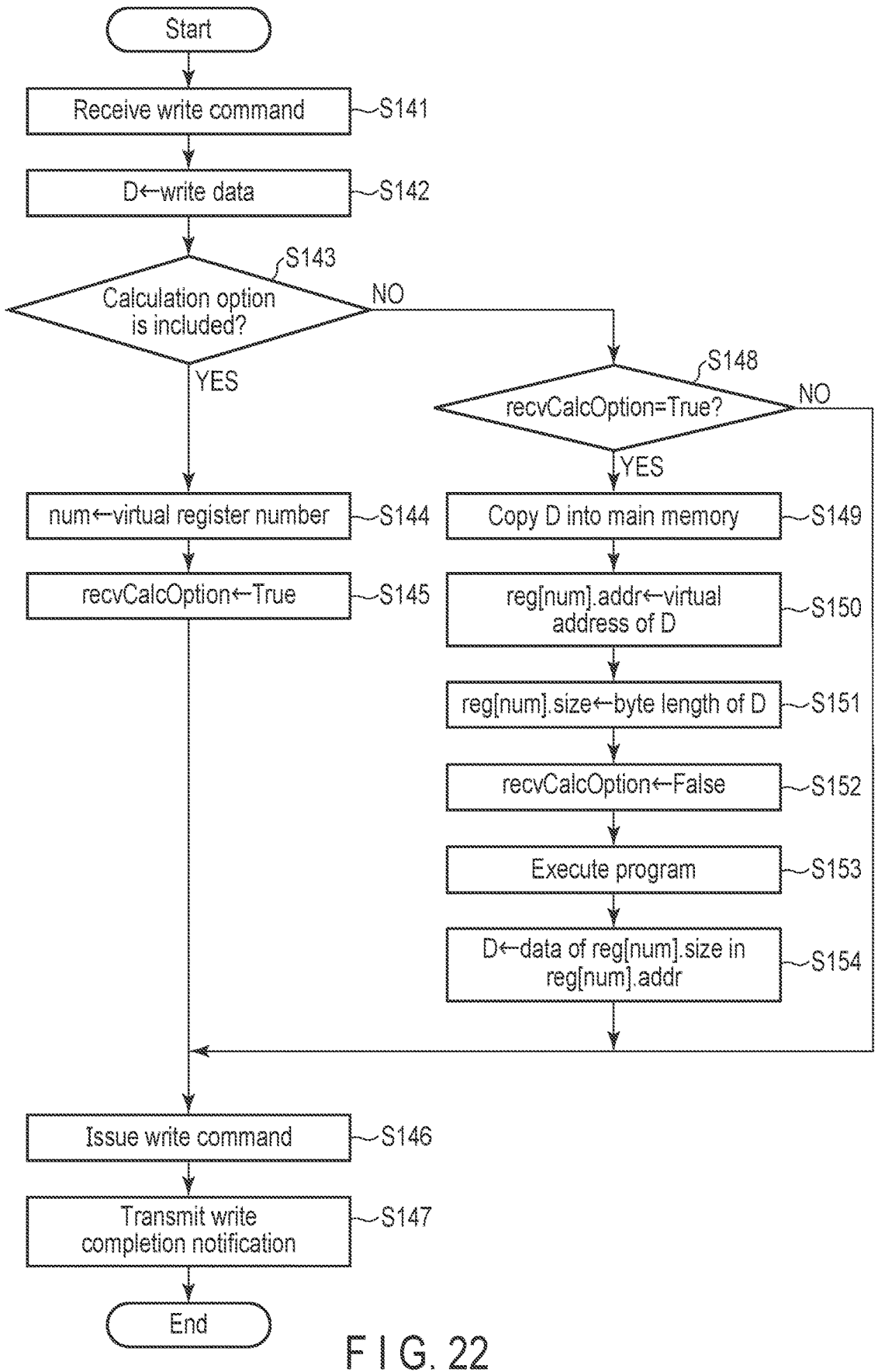
FIG. 22 is a flowchart illustrating an example of processing procedures to be carried out by the accelerator operating in a CoW mode according to the second embodiment.

FIG. 22 is a flowchart illustrating an example of processing procedures to be carried out by the accelerator 11 operating in the CoW mode.

First, the process in steps S141 to S143 corresponding to the process in steps S101 to S103 described above with reference to FIG. 20 is performed.

If it is determined in step S143 that the write data (which is the variable D) is a calculation option (YES in step S143), the process in steps S144 to S147 corresponding to the process in steps S104 to S107 illustrated in FIG. 20 described above is performed.

If it is determined that the write data is not a calculation option (NO in step S143), on the other hand, the process in step S148 corresponding to the process in step S108 illustrated in FIG. 20 described above is performed.

If it is determined in step S148 that the value of recvCalcOption is True (YES in step S148), the process in steps S149 to S152 corresponding to the process in steps S109 to S112 illustrated in FIG. 20 is performed.

Next, the calculation processing unit 117 refers to the virtual register table 114, and executes the program stored in the program register (step S153).

After the process in step S153 is performed, the memory management unit 116 refers to the virtual register table 114, reads data of the byte length (the number of bytes) of the data size set in the data size field (reg[num].size) in the virtual register from the virtual address set in the virtual address field (reg[num].addr) in the num-th virtual register, and copies the data into the variable D (step S154).

The process in steps S153 and S154 described above is similar to the process in steps S68 and S69 illustrated in FIG. 10 described above. After the process in step S154 is performed, the process in steps S146 and S147 is performed. In this case, in step S146, a write command (a write command for the variable D) including the variable D as the write data is transmitted to a storage 12.

Note that, if it is determined that the value of recvCalcOption is not True (which is False) (NO in step S148), the variable D (write data) is not host data accompanied by a calculation option, and therefore, the process in steps S146 and S147 is performed.

As described above, according to the process illustrated in FIG. 22, in a case where write data that is a calculation option is designated in a write command, the virtual register number calculated from the calculation option is stored into the variable num. Next, in a case where write data that is not a calculation option (host data accompanied by a calculation option) is designated in a write command, calculation instructions are processed with the write data, and the result of the processing can be written into the storage 12.

As described above, in the present embodiment, even in a case where the metadata (NVMe metadata) attached to the host data (NVMe data) described in the first embodiment described above is not used, a computing storage device (CSD) 10 can be appropriately controlled based on an I/O command in which a calculation option and host data accompanied by the calculation option are sequentially designated.

Note that, in the present embodiment, it is necessary to determine whether the host data designated in an I/O command is a calculation option as described above. A logical address space based on a logical address included in an I/O command (an NVMe Read command and an NVMe Write command) is divided beforehand into a first space for host data that is a calculation option and a second space for host data that is not a calculation option. That is, in the present embodiment, whether the host data designated in an I/O command is a calculation option can be determined (distinguished) based on the value of the logical address included in the I/O command (the logical address designated in the I/O command).

Third Embodiment

Next, a third embodiment is described. In the present embodiment, the aspects similar to those of the first embodiment described above are not described in detail, but aspects different from those of the first embodiment are mainly described.

Here, as described above in the first embodiment, for example, in a case where the free space in the main memory for storing a copy of host data is insufficient, it is necessary to secure the free space using the swap area set in the storage (in other words, to perform swapping). In the process to be performed when such free space is secured, an I/O command (an accelerator-issued command) is issued from the accelerator to the storage.

In this case, when the command ID (command identifier) assigned to an I/O command (a host-issued command) issued from the host overlaps with the command ID assigned to the accelerator-issued command, there is a possibility that the memory system (CSD) will perform an unintended operation and stop functioning properly.

Therefore, in the present embodiment, a configuration for causing the CSD to function properly even in a case where the above command IDs overlap with each other is described.

FIG. 23 is a block diagram illustrating an example of the configuration of a computing storage device (CSD) according to the present embodiment. Note that, in FIG. 23, the same portions as those in FIG. 1 described above are denoted by the same reference numerals as those used in FIG. 1, and detailed explanation thereof is not made herein.

As illustrated in FIG. 23, the present embodiment differs from the first embodiment described above in that an accelerator 11 includes an accelerator state table 118.

Here, in the present embodiment, it is assumed that NVMe is adopted as the communication protocol between a CSD 10 and a host 20, for example, and a host interface 111 included in the accelerator 11 of the CSD 10 has a submission queue and a completion queue.

The submission queue stores I/O commands received from the host 20 in order of reception. The completion queue stores command completions (completion notifications) received from a storage 12 in order of reception.

Note that a set of a submission queue and a completion queue is referred to as a queue pair. Also, the host interface 111 may have a plurality of queue pairs.

In the present embodiment, a memory management unit 116 manages the states of the submission queue and the completion queue, using the accelerator state table 118. Specifically, in a case where the free space in a main memory 113 for storing a copy of host data is insufficient, the memory management unit 116 stores, into the accelerator state table 118, the command ID assigned to the I/O command (host-issued command) in which the host data is designated, and queue information indicating the submission queue in which the I/O command is stored or the completion queue in which the command completion with respect to the I/O command is stored (in other words, the accelerator state table 118 is updated). The memory management unit 116 refers to such an accelerator state table 118, and controls whether to continue or suspend the processing for the respective queues (the submission queue and the completion queue).

Although an example of a page table 115 has been described with reference to FIG. 6 in the above first embodiment, the page table 115 herein may be different from FIG. 6.

In the description below, an example of the data structure of the page table 115 assumed in the present embodiment is explained with reference to FIG. 24. As illustrated in FIG. 24, the page table 115 stores storage states and storage destination real addresses associated with page numbers. In other words, while the page table 115 described above with reference to FIG. 6 stores storage destination flags, the page table 115 illustrated in FIG. 24 differs in storing storage states.

A storage state indicates whether the data (a copy of host data) in the page to which the associated page number is allocated is stored in the main memory 113 or is stored in the swap area set in the storage 12, or the page is not used.

Specifically, in a case where the storage state is 0, the storage state indicates that the data in the page to which the associated page number is allocated is stored in the main memory 113. The storage destination real address in this case indicates the address of the main memory 113.

In a case where the storage state is 1, on the other hand, the storage state indicates that the data in the page to which the associated page number is allocated is stored in the swap area set in the storage 12. The storage destination real address in this case indicates the address of the swap area.

Further, in a case where the storage state is 2, the storage state indicates that the page to which the associated page number is allocated is not used. In this case, any storage destination real address is not stored.

Note that, in FIG. 24, N page represents the total number of pages, S page represents the page size, and $S_{host}$ represents the size of the host data area. Note that sizes are measured in bytes.

Next, an example of a process (a paging algorithm) for securing free space in the main memory 113 using the page table 115 illustrated in FIG. 24 described above is described with reference to a flowchart shown in FIG. 25. Note that the explanation herein is based on the assumption that the virtual register size has a fixed length, and the page size is equal to the virtual register size.

First, as described above in the first embodiment, a virtual address is represented by a page number and a page offset, and the page number is the value of the higher $\log_2 N_{page}$ bit of the virtual address. Therefore, the memory management unit 116 refers to a virtual register table 114, and acquires the value of the higher $\log_2 N_{page}$ bit of the virtual address set in the virtual address field (reg[num].addr) of the num-th virtual register as the page number x (the first page number of the virtual register).

Figure 25:
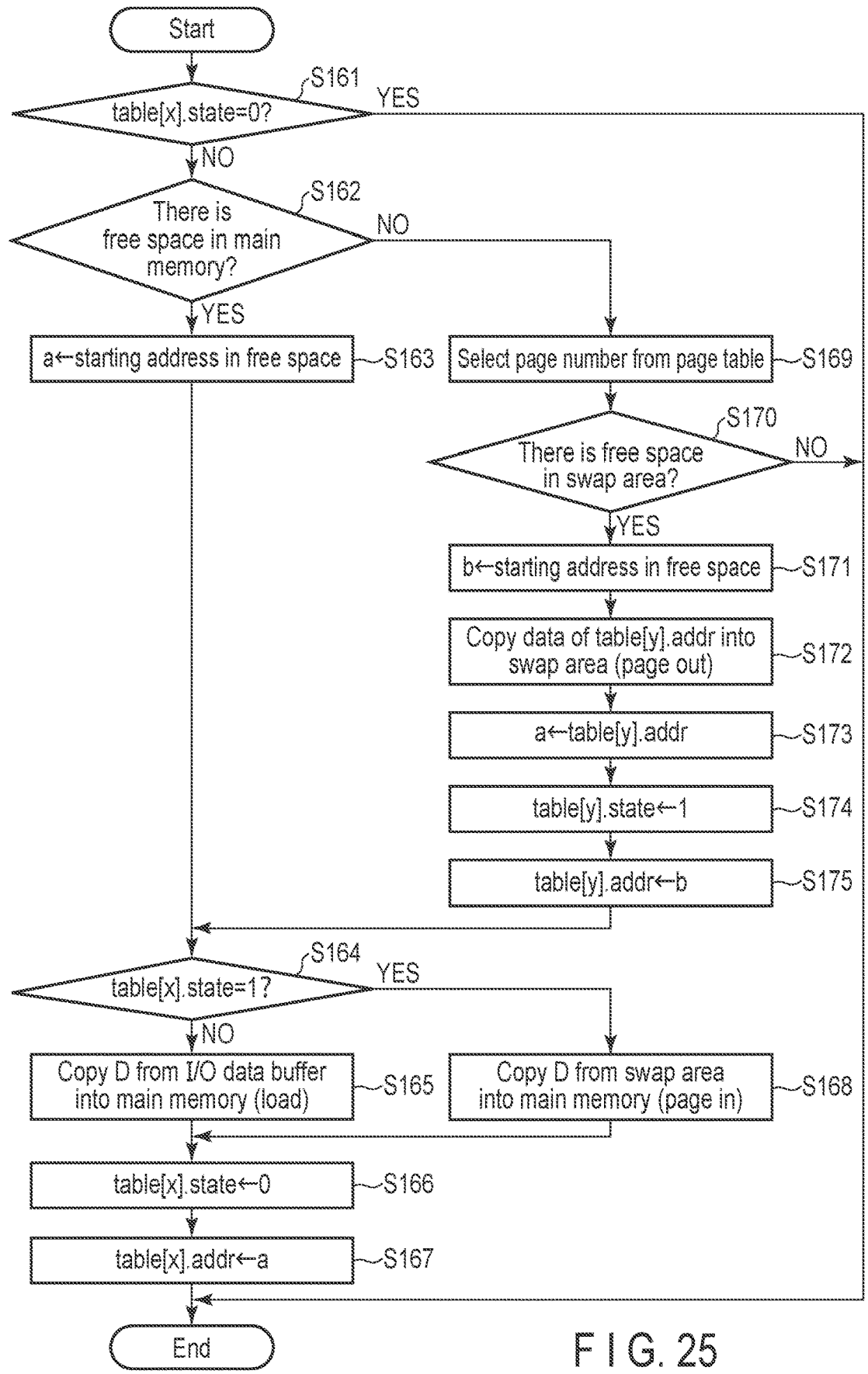
FIG. 25 is a flowchart illustrating an example of a paging algorithm according to the third embodiment.

Note that, in a case where the process illustrated in FIG. 25 is performed in step S6 illustrated in FIG. 5 or in step S35 illustrated in FIG. 8 (in other words, when a host-issued command is executed), the variable num (virtual register number) is calculated from a calculation option included in the metadata attached to the host data. Also, at the time of program execution, the variable num is acquired from an argument of a calculation instruction.

In this case, the memory management unit 116 refers to the storage state (the entry of the page number x) associated with the acquired page number x and stored in the page table 115, and determines whether the storage state is 0 (in other words, whether table[x].state=0) (step S161).

If the storage state is determined to be 0 (YES in step S161), the data (a copy of the host data) in the page to which the page number x is allocated is stored in the main memory 113, and therefore, the process illustrated in FIG. 25 comes to an end.

If the storage state is determined not to be 0 (NO in step S161), on the other hand, it is necessary to store the host data designated in an I/O command into the main memory 113, and therefore, the memory management unit 116 determines whether there is free space (continuous free space for one page) for storing the host data into the main memory 113 (step S162). Note that whether there is free space in the main memory 113 is determined based on the size of the host data, the metadata attached to the host data, or the like.

If it is determined that there is free space in the main memory 113 (YES in step S162), the memory management unit 116 stores the first address (real address) of the free space in the main memory 113 into a variable a (step S163).

After the process in step S163 is performed, the memory management unit 116 determines whether the storage state associated with the acquired page number x and stored in the page table 115 is 1 (in other words, whether table[x].state=1) (step S164).

If the storage state is determined not to be 1 (in other words, the storage state is 2) (NO in step S164), the memory management unit 116 copies (the host data stored in) the variable D into the main memory 113, based on the variable a. Note that the variable D stores the host data (I/O data)

temporarily stored in a buffer, and the variable D is copied into the area of one page starting from the address a in the main memory 113 (step S165).

After the process in step S165 is performed, the memory management unit 116 sets the value of the above storage state (table[x].state) associated with the page number x and stored in the page table 115 to 0 (step S166).

Further, the memory management unit 116 sets the value of the variable a to the storage destination real address (table[x].addr) associated with the page number x and stored in the page table 115 (step S167).

After the process in steps S166 and S167 is performed as described above, the process illustrated in FIG. 25 comes to a normal end.

If the storage state is determined to be 1 (YES in step S164), on the other hand, the memory management unit 116 reads the host data from the swap area set in the storage 12 based on the storage destination real address associated with the page number x and stored in the page table 115, and stores the host data into the variable D. The memory management unit 116 copies (the host data stored in) the variable D into the main memory 113, based on the variable a. In other words, the variable D in which the host data read from the logical address (which is the swap area) in the storage designated by table[x].addr with the use of an accelerator-issued command (a controller-issued command) is stored is copied into the area of one page starting from the address a in the main memory 113 (step S168). Note that the process in step S168 is called page-in.

After the process in step S168 is performed, the process in steps S166 and S167 described above is performed.

Further, if it is determined in step S162 that there is no free space in the main memory 113 (in other words, the free space is insufficient) (NO in step S162), the memory management unit 116 refers to the page table 115, and selects the page number y (the page number y associated with table[y].state=0) having 0 as the value of the storage state (step S169).

Next, the memory management unit 116 determines whether there is free space (continuous free space for one page) in the swap area set in the storage 12 described above (step S170).

If it is determined that there is free space in the swap area (YES in step S170), the memory management unit 116 stores the first logical address (real address) of the free space in the swap area into a variable b (step S171).

After the process in step S171 is performed, the memory management unit 116 copies the data (the data of one page) stored at the storage destination real address (table[y].addr) associated with the page number y and stored in the page table 115, into the address of the swap area stored in the variable b (step S172). Note that the process in step S172 corresponds to a process called page-out, which is a process of writing the data of one page from the address (table[y].addr) in the main memory 113 into the swap area (logical block address b) set in the storage 12, using an accelerator-issued command (a controller-issued command).

Next, the memory management unit 116 stores, into the variable a, the value of the above storage destination real address (table[y].addr) associated with the page number y and stored in the page table 115 (step S173).

The memory management unit 116 also sets the value of the storage state (table[y].state) associated with the page number y and stored in the page table 115 to 1 (step S174).

Further, the memory management unit 116 sets the value of the variable b to the storage destination real address associated with the page number y and stored in the page table 115 (step S175).

After the process in step S175 is performed, the above-described process in step S164 and the subsequent steps is performed.

According to such a process as illustrated in FIG. 25, in a case where the free space in the main memory 113 that stores (a copy of) host data is insufficient, swapping is performed on the data stored in the main memory 113 (in other words, the data is moved into the swap area), so that the host data can be copied (stored) into the memory area in the main memory 113 in which the data has been stored.

Note that, if it is determined in step S170 that there is no free space in the swap area (NO in step S170), the variable D cannot be copied into main memory 113, and therefore, the process illustrated in FIG. 25 comes to an abnormal end.

In the description below, an operation of the accelerator 11 according to the present embodiment is explained. In a case where a host-issued command (an I/O command) is a command that triggers the above-described swapping (this command will be hereinafter referred to as the swapping trigger command), the accelerator 11 according to the present embodiment operates so as to suspend the processing for a submission queue storing the command or a completion queue storing the command completion for the command, and perform the swapping using the command ID assigned to the swapping trigger command.

First, an example of the operation to be performed by the accelerator 11 in a case where the swapping trigger command is a write command is described with reference to FIG. 26.

In a case where a write command is issued from the host 20, the write command (a host-issued command) is received by the host interface 111 (step S181). Note that it is assumed that a command ID (hereinafter referred to as CID) "100" is assigned to the write command received in step S181.

After the process in step S181 is performed, the write command received in step S181 is stored into the submission queue in the host interface 111.

In a case where the host-issued command is a write command herein, the process described above with reference to FIG. 8 or 10 is performed, and the process illustrated in FIG. 25 is performed in step S35 illustrated in FIG. 8 or in step S65 illustrated in FIG. 10.

If it is determined in step S161 illustrated in FIG. 25 that the storage state that is associated with the page number acquired from the virtual address field in the virtual register designated by the metadata (secret calculation metadata) attached to the write command, and is stored in the page table 115 is not 0 (in other words, the data in the page to which the page number is assigned does not exist in the main memory 113), and it is determined in step S162 that there is no free space in the main memory 113, swapping needs to be performed to copy the variable D (write data) into the main memory 113, and the write command stored in the submission queue serves as the swapping trigger command.

In this case, the memory management unit 116 creates an entry for the swapping trigger command (write command) to which the above-mentioned CID "100" is assigned (an entry for "CID=100"), and stores the entry into the accelerator state table 118. The memory management unit 116 can suspend the processing of the submission queue (SQ) storing the swapping trigger command by referring to the accelerator state table 118 storing the entry for the swapping trigger command to which the CID "100" is assigned as above (step S182).

Here, FIG. 27 illustrates an example of the entry that is stored in the accelerator state table 118 so as to suspend the processing for the submission queue as described above.

As illustrated in FIG. 27, the entry stored in the accelerator state table 118 includes a swapping trigger command CID, a queue type, and a queue ID.

The swapping trigger command CID is the command ID assigned to the swapping trigger command described above. The entry illustrated in FIG. 27 includes the swapping trigger command CID "100".

The queue type corresponds to the type of the queue whose processing is to be suspended. In a case where the queue type is "0", the queue whose processing is to be suspended is a submission queue. In a case where the queue type is "1", the queue whose processing is to be suspended is a completion queue. The queue ID corresponds to the identification information assigned to the queue whose processing is to be suspended. Note that the same queue ID may be assigned to the submission queue and the completion queue forming the same queue pair. In other words, the queue type and the queue ID correspond to the queue information indicating the queue whose processing is to be suspended.

Since the processing for the submission queue storing the swapping trigger command is suspended herein, the entry illustrated in FIG. 27 includes the queue type "0" indicating a submission queue, and the queue ID "1" assigned to the submission queue.

As described above, host-issued commands are stored into the submission queue in order of reception. In a case where the entry illustrated in FIG. 27 is created, the processing of all the commands stored in the submission queue (which is the submission queue indicated by the queue information included in the entry) storing the swapping trigger command having the CID "100" assigned thereto is stopped (suspended).

After the process in step S182 is performed, the memory management unit 116 performs the process in steps S169 to S175 illustrated in FIG. 25, to secure free space in the main memory 113. In this case, it is necessary to write the data of one page into (the swap area set in) the storage 12 in step S172 illustrated in FIG. 25. Therefore, the memory management unit 116 (the accelerator 11) issues (transmits) a swapping command to the storage 12 via a storage interface 112 (step S183).

In this case, the memory management unit 116 issues the swapping command having the CID "100" assigned thereto, using the swapping trigger command CID "100" included in the entry stored in the accelerator state table 118.

Note that the swapping command is a write command (an accelerator-issued command) for performing swapping on the data stored in the main memory 113.

After the process in step S183 is performed, data is written into the storage 12 (the swap area) based on the swapping command, and the memory management unit 116 receives a command completion (a write completion notification) for the swapping command, from the storage 12 via the storage interface 112 (step S184).

Note that, in the example illustrated in FIG. 26, it is assumed that the accelerator 11 issues the swapping command twice to write the data of one page into the storage 12, and therefore, steps S185 and S186 similar to steps S183 and S184 are further carried out as illustrated.

After the process in step S186 (which is step S172 illustrated in FIG. 25) is performed, the memory management unit 116 deletes the entry for the swapping trigger command to which the CID "100" stored in the accelerator state table 118 described above is assigned, and resumes the processing for the submission queue storing the swapping trigger command (step S187).

In this case, the memory management unit 116 extracts the swapping trigger command from the submission queue, and issues (transmits) the swapping trigger command to the storage 12 via the storage interface 112 (step S188). Note that the swapping trigger command in step S188 is a write command (a host-issued command) to which the CID "100" is assigned as described above.

After the process in step S188 is performed, the host data (write data) is written into the storage 12, based on the logical address included in the write command. In this case, the memory management unit 116 receives a command completion (a write completion notification) for the swapping trigger command, from the storage 12 via the storage interface 112 (step S189). The command completion received in step S189 is stored into the completion queue forming a queue pair with the submission queue in which the above swapping trigger command is stored.

In this case, the host interface 111 transmits the command completion stored in the completion queue to the host 20 (step S190).

Note that the process in steps S188 to S199 described above corresponds to, for example, the process to be performed in steps S38 and S39 illustrated in FIG. 8 described above.

Figure 28:
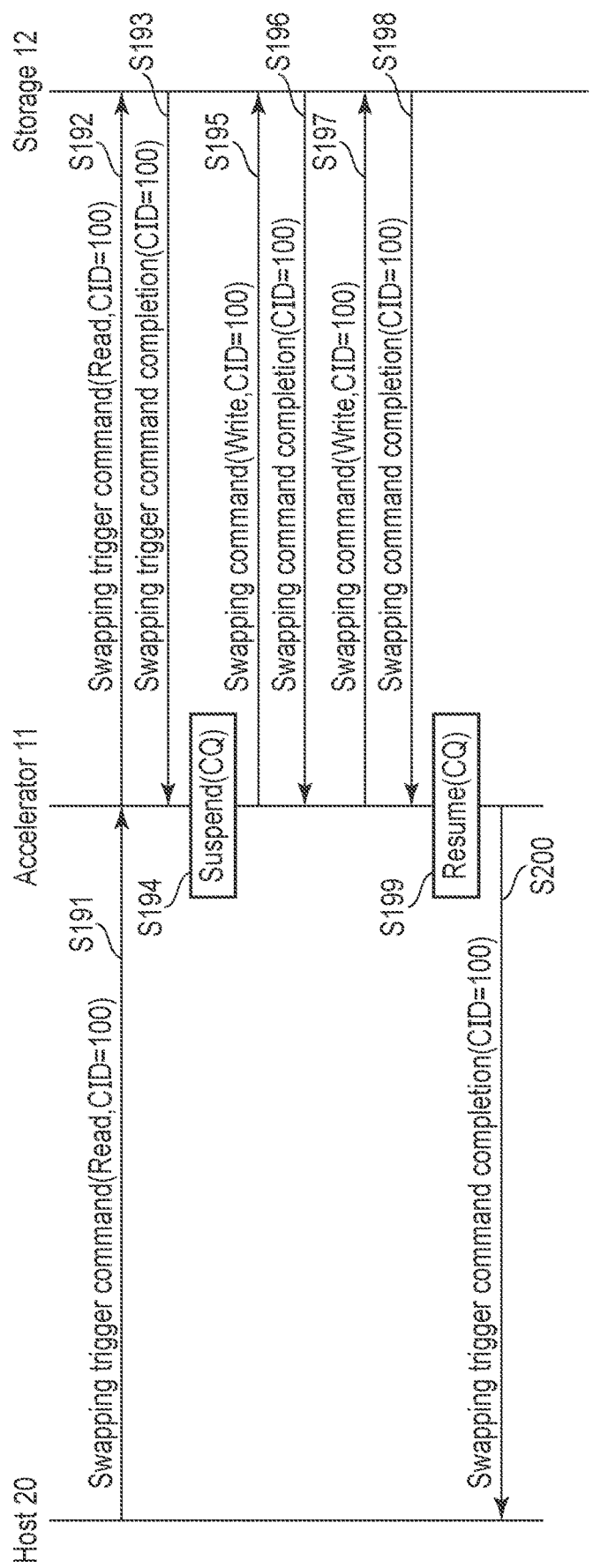
FIG. 28 is a sequence chart for explaining another example of an operation to be performed by the accelerator according to the third embodiment.

Next, an example of the operation to be performed by the accelerator 11 in a case where the swapping trigger command is a read command is described with reference to FIG. 28.

In a case where a read command is issued from the host 20, the read command (a host-issued command) is received by the host interface 111 (step S191). Note that it is assumed that a CID "100" is assigned to the read command received in step S191.

After the process in step S191 is performed, the read command received in step S191 is stored into the submission queue in the host interface 111.

Next, the memory management unit 116 extracts the read command stored in the submission queue, and issues (transmits) the extracted read command to the storage 12 via the storage interface 112 (step S192).

After the process in step S192 is performed, the host data (read data) is read from the storage 12, based on the logical address included in the read command. In this case, the memory management unit 116 receives a command completion (a read completion notification) for the read command, from the storage 12 via the storage interface 112 (step S193). The command completion received in step S193 is stored into the completion queue forming a queue pair with the submission queue in which the above read command is stored.

Note that the process in steps S191 to S193 described above corresponds to, for example, the process to be performed in steps S1 and S2 illustrated in FIG. 5 described above.

In a case where the host-issued command is a read command herein as described above, the process described above with reference to FIG. 5 or 9 is performed, and the process illustrated in FIG. 25 is performed in step S6 illustrated in FIG. 5 or in step S46 illustrated in FIG. 9.

If it is determined in step S161 illustrated in FIG. 25 that the storage state that is associated with the page number acquired from the virtual address field in the virtual register designated by the metadata (secret calculation metadata) attached to the read command, and is stored in the page table 115 is not 0 (in other words, the data in the page to which the page number is assigned does not exist in the main memory 113), and it is determined in step S162 that there is no free space in the main memory 113, swapping needs to be performed to copy the variable D (read data) into the main memory 113, and the read command (a host-issued command) corresponding to the command completion stored in the completion queue serves as the swapping trigger command.

In this case, the memory management unit 116 creates an entry for the swapping trigger command to which the CID "100" is assigned (an entry for "CID=100"), and stores the entry into the accelerator state table 118. The memory management unit 116 can suspend the processing of the completion queue (CQ) storing the command completion for the swapping trigger command, by referring to the accelerator state table 118 storing the entry for the swapping trigger command to which the CID "100" is assigned as above (step S194).

Here, FIG. 29 illustrates an example of the entry that is stored in the accelerator state table 118 so as to suspend the processing for the completion queue as described above.

The entry illustrated in FIG. 29 includes the swapping trigger command CID "100". Also, to suspend the processing for the completion queue storing the command completion for the swapping trigger command herein, the entry illustrated in FIG. 29 includes the queue type "1" indicating that the queue type is the completion queue, and the queue ID "1" assigned to the completion queue.

As described above, the completion queue stores command completions for host-issued commands in order of reception. In a case where the above entry illustrated in FIG. 29 is created, the processing of all the command completions stored in the completion queue storing the command completion for the swapping trigger command having the CID "100" assigned thereto (in other words, the completion queue indicated by the queue information included in the entry) is stopped (suspended).

Note that FIGS. 27 and 29 described above illustrate cases where the same queue ID is assigned to the submission queue and the completion queue forming the same queue pair.

After the process in step S194 is performed, the memory management unit 116 performs the process in steps S169 to S175 illustrated in FIG. 25, to secure free space in the main memory 113. In this case, the process in steps S195 to S198 corresponding to the process in S183 to S186 described above with reference to FIG. 26 is performed.

After the process in step S198 is performed, the memory management unit 116 deletes the entry for the swapping trigger command to which the CID "100" stored in the accelerator state table 118 described above is assigned, and resumes the processing for the completion queue storing the command completion for the swapping trigger command (step S199).

In this case, the host interface 111 transmits the command completion stored in the completion queue to the host 20 (step S200). Although not illustrated in FIG. 28, the read data is also transmitted from the host interface 111 to the host 20 as described above with reference to FIG. 5 and others.

Next, an example of the operation to be performed by the accelerator 11 in a case where two swapping trigger commands are used is described with reference to FIG. 30. It is assumed herein that first and second write commands are issued from the host 20, and the first and second write commands are swapping trigger commands.

In a case where the first write command is issued from the host 20, the first write command (a host-issued command) is received by the host interface 111 (step S201). Note that it is assumed that a CID "100" is assigned to the write command received in step S201.

Note that, in FIG. 30, it is assumed that the host interface 111 has a plurality of submission queues including at least first and second submission queues, and the first write command mentioned above is stored into the first submission queue.

Here, if it is determined in step S161 illustrated in FIG. 25 that the storage state that is associated with the page number acquired from the virtual address field in the virtual register designated by the metadata (secret calculation metadata) attached to the first write command, and is stored in the page table 115 is not 0 (in other words, the data in the page to which the page number is assigned does not exist in the main memory 113), and it is determined in step S162 that there is no free space in the main memory 113, swapping needs to be performed to copy the variable D (first write data) into the main memory 113, and the first write command stored in the first submission queue serves as a swapping trigger command (hereinafter referred to as the first swapping trigger command).

In this case, the memory management unit 116 creates an entry (an entry for CID=100) for the first swapping trigger command (the first write command), and stores the entry into the accelerator state table 118. The memory management unit 116 can suspend the processing of the first submission queue (SQ1) storing the first swapping trigger command, by referring to the accelerator state table 118 storing the entry for the first swapping trigger command as described above (step S202).

Further, in a case where the second write command is issued from the host 20, the second write command (a host-issued command) is received by the host interface 111 (step S203). Note that it is assumed that a CID "101" is assigned to the second write command received in step S203.

Note that the second write command described above is stored into the second submission queue included in the host interface 111.

Here, if it is determined in step S161 illustrated in FIG. 25 that the storage state that is associated with the page number acquired from the virtual address field in the virtual register designated by the metadata (secret calculation metadata) attached to the second write command, and is stored in the page table 115 is not 0 (in other words, the data in the page to which the page number is assigned does not exist in the main memory 113), and it is determined in step S162 that there is no free space in the main memory 113, swapping needs to be performed to copy the variable D (second write data) into the main memory 113, and the second write command stored in the second submission queue serves as a swapping trigger command (hereinafter referred to as the second swapping trigger command).

In this case, the memory management unit 116 creates an entry (an entry for CID=101) for the second swapping trigger command (the second write command), and stores the entry into the accelerator state table 118. The memory management unit 116 can suspend the processing of the second submission queue (SQ2) storing the second swapping trigger command, by referring to the accelerator state table 118 storing the entry for the second swapping trigger command as described above (step S204).

Here, FIG. 31 illustrates an example of the entries that are stored in the accelerator state table 118 so as to suspend the processing for the first and second submission queues as described above.

In FIG. 31, the entries for the first and second swapping trigger commands are illustrated, and the entry for the first swapping trigger command includes the swapping trigger command CID "100". Also, since the processing for the first submission queue storing the first swapping trigger command is suspended herein, the entry for the first swapping trigger command illustrated in FIG. 31 includes the queue type "0" indicating a submission queue, and the queue ID "1" assigned to the first submission queue.

Further, the entry for the second swapping trigger command includes the swapping trigger command CID "101". Also, since the processing for the second submission queue storing the second swapping trigger command is suspended herein, the entry for the second swapping trigger command illustrated in FIG. 31 includes the queue type "0" indicating a submission queue, and the queue ID "2" assigned to the second submission queue.

In the example illustrated in FIG. 30, after the process in step S202 is performed, the process in steps S301 to S306 corresponding to the process in steps S183, S184, and S187 to S190 illustrated in FIG. 26 described above is performed as the process related to the first swapping trigger command.

Specifically, in step S301, the memory management unit 116 issues, to the storage 12 via the storage interface 112, a swapping command (hereinafter referred to as the first swapping command) having the CID "100" assigned thereto, using the swapping trigger command CID "100" included in the entry for the first swapping trigger command stored in the accelerator state table 118 described above.

In step S302, the memory management unit 116 also receives a command completion (a first swapping command completion) for the first swapping command, from the storage 12 via the storage interface 112.

In step S303, the memory management unit 116 further deletes the entry for the first swapping trigger command stored in the accelerator state table 118 described above, and resumes the processing for the first submission queue storing the first swapping trigger command.

In step S304, the memory management unit 116 also extracts the first swapping trigger command from the first submission queue, and issues the first swapping trigger command to the storage 12 via the storage interface 112.

In step S305, the memory management unit 116 further receives a command completion (a first swapping trigger command completion) for the first swapping trigger command, from the storage 12 via the storage interface 112. The received first swapping trigger command completion is stored into a first completion queue that forms a queue pair with the first submission queue.

Lastly, in step S306, the host interface 111 transmits the first swapping trigger command completion stored in the first completion queue to the host 20.

After the process in step S306 is performed, processing of another host-issued command stored in the first submission queue is performed. In a case where the host-issued command (a write command or a read command) is a swapping trigger command, a process corresponding to the process in steps S202 and S301 to S306 is repeated.

Further, in the example illustrated in FIG. 30, after the process in step S204 is performed, the process in steps S401 to S406 corresponding to the process in steps S183, S184, and S187 to S190 illustrated in FIG. 26 described above is performed as the process related to the second swapping trigger command.

Specifically, in step S401, the memory management unit 116 issues, to the storage 12 via the storage interface 112, a swapping command (hereinafter referred to as the second swapping command) having the CID "101" assigned thereto, using the swapping trigger command CID "101" included in the entry for the second swapping trigger command stored in the accelerator state table 118 described above.

In step S402, the memory management unit 116 also receives a command completion (a second swapping command completion) for the second swapping command, from the storage 12 via the storage interface 112.

In step S403, the memory management unit 116 further deletes the entry for the second swapping trigger command stored in the accelerator state table 118 described above, and resumes the processing for the second submission queue storing the second swapping trigger command.

In step S404, the memory management unit 116 also extracts the second swapping trigger command from the second submission queue, and issues the second swapping trigger command to the storage 12 via the storage interface 112.

In step S405, the memory management unit 116 further receives a command completion (a second swapping trigger command completion) for the second swapping trigger command, from the storage 12 via the storage interface 112. The received second swapping trigger command completion is stored into a second completion queue that forms a queue pair with the second submission queue.

Lastly, in step S406, the host interface 111 transmits the second swapping trigger command completion stored in the second completion queue to the host 20.

After the process in step S406 is performed, processing of another host-issued command stored in the second submission queue is performed. In a case where the host-issued command (a write command or a read command) is a swapping trigger command, a process corresponding to the process in steps S203 and S401 to S406 is repeated.

Note that, in the example illustrated in FIG. 30, it is assumed that the data of one page is written into the storage 12 (the swap area) in accordance with swapping commands (first and second swapping commands) that are issued once. However, as described above with reference to FIG. 26, the first and second swapping commands may be issued a plurality of times to write the data of one page into the storage 12.

Further, FIG. 30 illustrates an example in which the process is performed in the order of steps S201, S202, S301, S203, S204, S401, S302 to S304, S402 to S404, S305, S306, S405, and S406. However, the order of these steps may be different from that shown in FIG. 30.

As described above, in the present embodiment, the host interface 111 (first interface) includes the submission queue (first queue) and the completion queue (second queue), and, in a case where the free space in the main memory 113 (memory) for storing a copy of host data is insufficient, the memory management unit 116 stores, into the accelerator state table 118, the CID assigned to the host-issued command (I/O command) in which the host data is designated, and the queue information (the queue type and the queue ID) indicating the submission queue storing the host-issued command or the completion queue storing the command completion (completion notification) for the host-issued command, and interrupts the processing for the queue indicated by the queue information. Also, in the present embodiment, the memory management unit 116 issues, to the storage 12, a swapping command (an accelerator-issued command) for performing swapping on the data (second host data) stored in the main memory 113, using the CID (swapping trigger command CID) stored in the accelerator state table 118.

With such a configuration according to the present embodiment, even in a case where CIDs (command IDs) overlap between a host-issued command and an accelerator-issued command as described above, it is possible to cause the CSD 10 to function properly (in other words, I/O control during swapping is appropriately performed).

Note that, to prevent the CSD 10 from stopping functioning properly due to the above-mentioned overlap between CIDs, it is conceivable to divide the CID space between the host-issued command and the accelerator-issued command. In the case of such a configuration, however, it is necessary to change the implementation on the host side to be connected to the CSD 10.

Further, if the CID space is shared between a host-issued command and an accelerator-issued command, and the processing of the host-issued command is suspended during the processing of the accelerator-issued command, it is necessary to avoid suspension of the processing of a host-issued command unrelated to swapping.

Therefore, in the present embodiment, the CID assigned to a host-issued command (a swapping trigger command) that triggers swapping is used as the CID of an accelerator-issued command for swapping (a swapping command), so that it is possible to cause the CSD 10 to function properly, without changing the above-described host-side implementation. Also, with the configuration according to the present embodiment, the processing of a host-issued command that is not a swapping trigger command (the processing of a queue different from a swapping trigger command) can be performed even during the processing of a swapping command, and accordingly, there is no need to suspend the processing of a host-issued command unrelated to swapping.

Note that, in the present embodiment described above, the processing for a submission queue or a completion queue is suspended when the data of one page is written into the swap area set in the storage 12 (in other words, the accelerator 11 issues a write command for page-out) in step S172 illustrated in FIG. 25. Note also that the processing for a submission queue or a completion queue may be suspended when host data is read from the swap area set in the storage 12 (in other words, the accelerator 11 issues a read command for page-in), for example, in step S168 illustrated in FIG. 25.

In the configuration mainly described in the present embodiment, the accelerator state table 118 is added to the accelerator 11 illustrated in FIG. 1 described above. However, as illustrated in FIG. 32, the present embodiment is based on the assumption that the accelerator state table 118 is added to the accelerator 11 illustrated in FIG. 16 described above, for example. In this case, host-issued commands and accelerator-issued commands described in the present embodiment correspond to NVMe commands.

Further, as illustrated in FIG. 33, the present embodiment may be a configuration in which the accelerator state table 118 is added to the accelerator 11 illustrated in FIG. 17 described above, for example.

Alternatively, as illustrated in FIG. 34, the present embodiment may be a configuration in which the accelerator state table 118 is added to the accelerator 11 illustrated in FIG. 18 described above, for example.

Note that the configurations illustrated in FIGS. 32 to 34 are similar to those illustrated in FIGS. 16 to 18 except for the addition of the accelerator state table 118, and therefore, detailed explanation thereof is not made herein. Also, FIGS. 32 to 34 were prepared for explaining example applications of the accelerator 11 according to the present embodiment, and therefore, the configurations illustrated in FIGS. 32 to 34 may be changed as appropriate.

Although the present embodiment has been described mainly on the assumption that the accelerator state table 118 is added to the configuration described in the first embodiment, it is also possible to adopt a configuration combined with the second embodiment described above.

According to at least one of the embodiments described above, it is possible to provide a controller and a control method capable of appropriately controlling a computing storage.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A controller for controlling a computing storage device that is connectable to a host and includes a storage, the controller comprising:
    a first interface configured to receive an I/O command from the host, the I/O command being designating first host data;
    a second interface configured to transmit and receive the first host data to and from the storage;
    a memory for storing a copy of the first host data designated in the I/O command;
    a virtual register table having a virtual address specified by a page number assigned to a page in which data to be used to process a calculation instruction in accordance with a calculation option accompanying the first host data is stored and a page offset, and a data size of the data, the virtual address and the data size being associated with each virtual register number identified based on the calculation option;
    a memory management unit configured to store, into the memory, the copy of the first host data designated in the I/O command, and update the virtual register table; and
    a calculation processing unit configured to process the calculation instruction using the first host data designated in the I/O command, by referring to the virtual register table.

2. The controller according to claim 1, further comprising a page table having a flag indicating a storage destination of data and a real address of the storage destination, the flag and the real address being associated with each page number, wherein
    the storage includes a first area for storing the first host data, and a second area for temporarily storing the copy of the first host data stored in the memory, and
    when a free space in the memory for storing the copy of the first host data designated in the I/O command is insufficient, the memory management unit is configured to store, into the second area, a copy of second host data stored in a third area in the memory by referring to the page table, store the copy of the first host data into the third area, and update the page table.

3. The controller according to claim 1, wherein
the I/O command includes a read command for reading the first host data from the storage,
the calculation option designates an operation mode of the computing storage device, and
when the designated operation mode is a copy-with-read (CwR) mode, the memory management unit is configured to copy, into the memory, the first host data read from the storage based on the read command, and set a virtual address of a destination of the copying and a data size of the first host data in the virtual register table, the virtual address of the destination and the data size of the first host data being associated with the virtual register number identified based on the calculation option.

4. The controller according to claim 1, wherein
the I/O command includes a write command for writing the first host data into the storage,
the calculation option designates an operation mode of the computing storage device, and
when the designated operation mode is a copy-with-write (CwW) mode, the memory management unit is configured to copy, into the memory, the first host data to be written into the storage based on the write command, and set a virtual address of a destination of the copying and a data size of the first host data in the virtual register table, the virtual address of the destination and the data size of the first host data being associated with the virtual register number identified based on the calculation option.

5. The controller according to claim 1, wherein
the I/O command includes a read command for reading the first host data from the storage,
the calculation option designates an operation mode of the computing storage device,
when the designated operation mode is a compute-on-read (CoR) mode, the memory management unit is configured to copy, into the memory, the first host data read from the storage based on the read command, and set a virtual address of a destination of the copying and a data size of the first host data in the virtual register table, the virtual address of the destination and the data size of the first host data being associated with the virtual register number identified based on the calculation option,
the calculation processing unit is configured to process the calculation instruction using the first host data copied into the memory by executing a program that is set beforehand, and
the first interface is configured to transmit a result of the processing to the host.

6. The controller according to claim 1, wherein
the I/O command includes a write command for writing the first host data into the storage,
the calculation option designates an operation mode of the computing storage device,
when the designated operation mode is a compute-on-write (CoW) mode, the memory management unit is configured to copy, into the memory, the first host data to be written into the storage based on the write command, and set a virtual address of a destination of the copying and a data size of the first host data in the virtual register table, the virtual address of the destination and the data size of the first host data being associated with the virtual register number identified based on the calculation option,
the calculation processing unit is configured to process the calculation instruction using the first host data copied into the memory by executing a program that is set beforehand, and
the second interface is configured to transmit a result of the processing to the storage.

7. The controller according to claim 1, wherein the calculation instruction includes a secret calculation instruction.

8. The controller according to claim 1, wherein
a copy of first host data which is not accompanied by the calculation option is not stored into the memory, and
processing of the calculation instruction using the first host data which is not accompanied by the calculation option is not performed.

9. The controller according to claim 1, wherein
the first interface is connectable to the host, based on an NVMe standard, and
the I/O command is a command conforming to the NVMe standard.

10. The controller according to claim 9, wherein the calculation option accompanying the first host data is included in metadata attached to the first host data.

11. The controller according to claim 9, wherein the calculation option accompanying the first host data is designated as second host data different from the first host data.

12. The controller according to claim 11, wherein
a read command and a write command conforming to the NVMe standard each include a logical address to be used to access the storage,
a logical address space based on the logical address includes a first space for the first host data and a second space for the second host data, and
the first and second host data are distinguished based on the logical addresses included in the read command and the write command.

13. The controller according to claim 1, wherein
the storage is a nonvolatile memory, and
the controller is connected to the nonvolatile memory, and is configured to control the nonvolatile memory.

14. The controller according to claim 13, wherein the computing storage device is a solid state drive (SSD).

15. The controller according to claim 1, wherein the controller is connectable to the host via a network in conformity with an NVMe-oF standard.

16. The controller according to claim 15, wherein
the computing storage device includes an NVMe-oF target module, and
the controller is disposed inside the NVMe-oF target module.

17. The controller according to claim 1, further comprising
a state table, wherein
the first interface includes a first queue being configured to store I/O commands received from the host in order of reception, and a second queue being configured to store completion notifications for the I/O commands received from the storage in order of reception,
when the free space in the memory for storing the copy of the first host data is insufficient, the memory management unit is configured to store, into the state table, a command ID assigned to the I/O command designating the first host data and queue information indicating the first queue storing the I/O command or the second queue storing the completion notification for the I/O command, and suspend processing for the first queue or the second queue indicated by the queue information, and the memory management unit is configured to issue, to the storage, a swapping command for swapping on the second host data stored in the memory, using the command ID stored in the state table.

18. A control method for controlling a computing storage device that is connectable to a host and includes a storage, the control method comprising:

receiving an I/O command from the host, the I/O command being designating first host data;

storing a copy of the first host data designated in the I/O command into a memory, and updating a virtual register table; and processing a calculation instruction using the first host data designated in the I/O command, by referring to the virtual register table, wherein the virtual register table has a virtual address represented by a page number assigned to a page in which data to be used to process the calculation instruction in accordance with a calculation option accompanying the first host data is stored and a page offset, and a data size of the data, the virtual address and the data size being associated with each virtual register number identified based on the calculation option.

* * * * *